(12) United States Patent
Jiang et al.

(10) Patent No.: US 7,116,667 B2
(45) Date of Patent: Oct. 3, 2006

(54) DETERMINATION OF ACCEPTABLE SEQUENCE NUMBER RANGES IN A COMMUNICATIONS PROTOCOL

(75) Inventors: Sam Shiaw-Shiang Jiang, Hsin-Chu (TW); Alex Chung-Ming Sun, Tao-Yuan Hsien (TW)

(73) Assignee: ASUSTeK Computer Inc., Taipei (TW)

( * ) Notice: Subject to any disclaimer, the term of this patent is extended or adjusted under 35 U.S.C. 154(b) by 1177 days.

(21) Appl. No.: 09/683,722

(22) Filed: Feb. 7, 2002

(65) Prior Publication Data

US 2002/0126629 A1    Sep. 12, 2002

Related U.S. Application Data

(63) Continuation-in-part of application No. 09/779,490, filed on Feb. 9, 2001.

(51) Int. Cl.
*H04L 12/28* (2006.01)
(52) U.S. Cl. ............... 370/394; 370/389; 370/474
(58) Field of Classification Search .............. None
See application file for complete search history.

(56) References Cited

U.S. PATENT DOCUMENTS

| | | | | |
|---|---|---|---|---|
| 6,219,349 | B1 * | 4/2001 | Kobayashi et al. | 370/395.6 |
| 6,430,155 | B1 * | 8/2002 | Davie et al. | 370/232 |
| 6,862,622 | B1 * | 3/2005 | Jorgensen | 709/226 |
| 7,058,027 | B1 * | 6/2006 | Alessi et al. | 370/310.1 |

* cited by examiner

*Primary Examiner*—Doris H. To
*Assistant Examiner*—Thien Tran
(74) *Attorney, Agent, or Firm*—Winston Hsu

(57) ABSTRACT

A wireless communications protocol utilizes protocol data units (PDUs) for transmitting and receiving service data units (SDUs). Each PDU has a sequence number of n bits for indicating a relative sequential ordering of the PDU in a transmitted or received stream of PDUs. A transmission time interval (TTI) is also used in which a predetermined number of PDUs are transmitted or received. PDUs are received within a TTI. A starting sequence number and an ending sequence number for received PDUs within the TTI are found. Any received PDU within the TTI that has a sequence number that is sequentially before the starting sequence number or that is sequentially after the ending sequence number is discarded. The incremental magnitude of the sequence numbers is used to signal discarded PDUs.

37 Claims, 13 Drawing Sheets

DETERMINATION OF ACCEPTABLE SEQUENCE NUMBER RANGES IN A COMMUNICATIONS PROTOCOL

CROSS REFERENCE TO RELATED APPLICATIONS

This is a continuation-in-part of U.S. application Ser. No. 09/779,490, filed Feb. 9, 2001, and which is included herein by reference.

BACKGROUND OF INVENTION

1. Field of the Invention

The present invention relates to a wireless communications protocol. More specifically, the present invention discloses a method for determining acceptable sequence number ranges in a transmission time interval.

2. Description of the Prior Art

The surge in public demand for wireless communication devices has placed pressure upon industry to develop increasingly sophisticated communications standards. The 3$^{rd}$ Generation Partnership Project (3GPP™) is an example of such a new communications protocol. Such standards utilize a three-layer approach to communications. Please refer to FIG. 1. FIG. 1 is a block diagram of the three layers in a communications protocol. In a typical wireless environment, a first station 10 is in wireless communications with one or more second stations 20. An application 13 on the first station 10 composes a message 11 and has it delivered to the second station 20 by handing the message 11 to a layer 3 interface 12. The layer 3 interface 12 may also generate some layer 3 signaling messages 12a for the purpose of controlling layer 3 operations. An example of such a layer 3 signaling message is a request for ciphering key changes, which are generated by the layer 3 interfaces 12 and 22 of both the first and the second stations, respectively. The layer 3 interface 12 delivers either the message 11 or the layer 3 signaling message 12a to a layer 2 interface 16 in the form of layer 2 service data units (SDUs) 14. The layer 2 SDUs 14 may be of any length. The layer 2 interface 16 composes the SDUs 14 into one or more layer 2 protocol data units (PDUs) 18. Each layer 2 PDU 18 is of a fixed length, and is delivered to a layer 1 interface 19. The layer 1 interface 19 is the physical layer, transmitting data to the second station 20. The transmitted data is received by the layer 1 interface 29 of the second station 20 and reconstructed into one or more PDUs 28, which are passed up to the layer 2 interface 26. The layer 2 interface 26 receives the PDUs 28 and builds up one or more layer 2 SDUs 24. The layer 2 SDUs 24 are passed up to the layer 3 interface 22. The layer 3 interface 22, in turn, converts the layer 2 SDUs 24 back into either a message 21, which should be identical to the original message 11 that was generated by the application 13 on the first station 10, or a layer 3 signaling message 22a, which should be identical to the original signaling message 12a generated by the layer 3 interface 12 and which is then processed by the layer 3 interface 22. The received message 21 is passed to an application 23 on the second station 20.

Of particular interest is the layer 2 interface, which acts as a buffer between the relatively high-end data transmission and reception requests of the layer 3 interfaces 12 and 22, and the low-level requirements of the physical transmission and reception process at the layer 1 interfaces 19 and 29. Please refer to FIG. 2. FIG. 2 is a simplified diagram of a transmission/reception process from a layer 2 perspective. The layer 2 interface 32 of a first station 30 receives a string of SDUs 34 from the layer 3 interface 33. The layer 2 SDUs 34 are sequentially ordered from 1 to 5, and are of an unequal length. The layer 2 interface 32 converts the string of SDUs 34 into a string of layer 2 PDUs 36. The layer 2 PDUs 36 are sequentially ordered from 1 to 4, and are usually all of an equal length. The string of layer 2 PDUs 36 is then sent off to the layer 1 interface 31 for transmission. A reverse process occurs at the second station 40, with the second station 40 layer 2 interface 42 converting a received string of layer 2 PDUs 46 into a received string of layer 2 SDUs 44, which are then passed up to a layer 3 interface 43. There are two delivery modes: in-sequence delivery and out-of-sequence delivery. If the established connection between the first station 30 and the second station 40 is configured to be in the in-sequence delivery mode, the multilayered protocol insists that the layer 2 interface 42 present the SDUs 44 to the layer 3 interface 43 in order. That is, the layer 2 interface 42 must present the layer 2 SDUs 44 to the layer 3 interface 43 in the sequential order of the SDUs 44, beginning with SDU 1 and ending with SDU 5. The ordering of the SDUs 44 may not be scrambled, nor may a subsequent SDU 44 be delivered to the layer 3 interface 43 until all of the prior SDUs 44 have been delivered. However, if the established connection is configured to be in the out-of-sequence delivery mode, the layer 2 interface 42 can present the layer 2 SDUs 44 to the layer 3 interface 43 out of sequential order.

In line transmissions, such requirements are relatively easy to fulfill. In the noisy environment of wireless transmissions, however, the second station 40 often misses data. Additionally, under some transmission modes, the layer 2 interface 32 of the first station 30 may actually discard some of the layer 2 SDUs 34 or layer 2 PDUs 36 after a predetermined amount of time if the layer 2 SDUs 34 or PDUs 36 have not been transmitted. Some layer 2 PDUs in the received string of layer 2 PDUs 46 will therefore be missing, either due to deliberate discarding from the transmitting side, or from improper reception on the receiver side. Ensuring that the layer 3 SDUs 44 are presented in order, when the system is in the in-sequence delivery mode, can thus pose a significant challenge. Even in the out-of sequence delivery mode, a layer 2 SDU 44 cannot be presented until all of its composing layer 2 PDUs 46 have been correctly received. The format of the layer 2 PDUs 36, 46 is thus carefully considered to help overcome these obstacles.

Generally speaking, there are two broad modes for transmitting and receiving data: acknowledged mode, and unacknowledged mode. For acknowledged mode data, the second station 40 sends a special acknowledging signal to the first station 30 to indicate successfully received layer 2 PDUs 46. No such signaling is performed for unacknowledged mode data. For purposes of the present discussion, only the unacknowledged mode of data transmission and reception is considered. Please refer to FIG. 3 in conjunction with FIG. 2. FIG. 3 is a block diagram of an unacknowledged mode data (UMD) PDU 50, as defined by the 3 GPP™ TS 25.322 specification, and which is included herein by reference. The UMD PDU 50 is used to transmit unacknowledged mode SDU data from the layer 3 interface 33 of the first station 30, which is then received and reassembled by the second station 40 and presented to the layer 3 interface 43 as the layer 2 SDUs 44. That is, layer 2 UMD PDUs 36, 46 are used to carry the layer 2 SDUs 34, 44 that originate from the layer 3 interfaces 33, 43. The UMD PDU 50 is divided into several fields, as defined by the layer 2 protocol. The first field 51 is a sequence number (SN) field, and is seven bits long. Successive UMD PDUs have successively higher sequence numbers, and in this way a receiver can properly reassembled UMD PDUs 46 to form the SDUs 44. That is, if a UMD PDU 36 is transmitted with a sequence number value equal to 19, the next UMD PDU 36 would be transmitted with a sequence number value equal to 20, and so forth. The next field, 52*a*, is an extension bit, and when set indicates the presence of a following length indicator (LI). An LI may be either 7 bits long or 15 bits long, and is used to indicate the ending position of an SDU within the UMD PDU 50. If a single SDU completely fills the data region 58 of the UMD PDU 50, then the extension bit 52*a* would be zero, thereby indicating that no LI is present. In the example UMD PDU 50, however, there are at least two SDUs ending in the PDU 50: SDU_1 57*a*, and SDU_2 57*b*. There must, therefore, be two LIs to indicate the respective ends of the SDU_1 57*a* and the SDU_2 57*b*. A UMD PDU following the UMD PDU 50 would hold the LI for SDU_3 57*c*. The first LI, $LI_1$, is in field 56*a* following the extension bit field 52*a*, and marks the end of the SDU_1 57*a*. $LI_1$ 56*a* has an extension bit 52*b* that is set, indicating the presence of another LI, $LI_2$ in field 56*b*. $LI_2$ 56*b* indicates the ending position of the SDU_2 57*b*, and has an extension bit 52*c* that is cleared, signifying that there are no more LIs, and that the data region 58 is thus beginning. The data region is used to carry the SDUs 57*a*, 57*b*, 57*c*.

Please refer to FIG. 4 in conjunction with FIG. 5. FIG. 4 is a more detailed block diagram of a prior art layer 2 interface 60. FIG. 5 is a timing diagram of transmission time intervals (TTIs) 72. The layer 2 interface 60 comprises a radio link control (RLC) layer 62 on top of, and in communications with, a medium access control (MAC) layer 64. The MAC layer 64 acts as an interface between the RLC layer 62 and the layer 1 interface 61. The MAC layer 64 divides the transmission of PDUs 63, which the MAC layer 64 receives from the RLC layer 62, into a series of transmission time intervals (TTIs) 72. Each TTI 72 has an interval length that is identical to the other TTIs 72, such as a 20 milliseconds (ms) interval. Within the time span of each TTI 72, the MAC layer 64 sends off a set of transport blocks 74 to the layer 1 interface 61 to be transmitted. The set of transport blocks 74 comprises a predetermined number of transport blocks 74*a*. Each of the transport blocks 74*a* comprises one RLC PDU 75 and may optionally carry a MAC header 76. All of the RLC PDUs 75 and, thus, the transport blocks 74*a* within each TTI 72 are of the same length. The number of RLC PDUs 75 (or transport blocks 74*a*) within each transport block set 74 between TTIs 72 may change. For example, in FIG. 5 the first TTI 72 transmits six PDUs 75, and the subsequent TTI 72 transmits three PDUs 75. The actual data length of the PDUs 75 may also vary from TTI 72 to TTI 72, but is always the same within each TTI 72. Consequently, prior to transmission for each TTI 72, the MAC layer 64 informs the RLC layer 62 of the number of PDUs 75 required for the TTI 72, and the size for the PDUs 75 within the TTI 72. The RLC layer 62 composes SDUs 65*a*, held in a buffer 65, into appropriately sized PDUs, and delivers the required number of PDUs 63 to the MAC layer 64. As noted, the MAC layer may optionally add a MAC header 76 to each RLC PDU 75 to generate the transport blocks 74*a* for the transport block set 74, and then the transport block set 74 of PDUs 74 is sent off to the layer 1 interface 61 for transmission.

For purposes of security, PDUs 63, 75 are encrypted before being delivered to the layer 1 interface 61. The encryption is usually performed in either the MAC layer 64 or the RLC layer 62. For purposes of the present discussion, it will be assumed that encryption of the PDUs 63, 75 occurs in the RLC layer 62. Prior to delivering PDUs 63 to the MAC layer 64, an encryption engine 66 encrypts all but the first octet of data within each PDU 63, 75, and delivers encrypted PDUs 63 to the MAC layer 64. As the first octet of each PDU 63, 75 is not encrypted, the sequence number 51 (from FIG. 3) is transmitted in an unencrypted state. The reason for this is that the encryption engine 66 uses the sequence number 51 of each PDU 63, 75 to generate the encrypted PDUs 63, 75. Consequently, on the receiver side, the sequence number 51 must be made available to perform the decryption of the PDUs 75. The sequence number 51 of each PDU is used to form a count-c value 66*c*. The count-c value 66*c* is a 32-bit number that comprises a hyper-frame number (HFN) 66*h* as the most significant 25 bits, and the sequence number 51 of the PDU 63, 75 to be encrypted as the least significant 7 bits 66*s*. The HFN 66*h* is initially zero, but is incremented upon detection of rollover in the PDU 63, 75 sequence numbers 51. For example, if the HFN 66*h* has a value of zero, and a PDU 63, 75 has a sequence number value 51 of 127, count-c 66*c* would have a value of 127 that is used to encrypt the PDU 63, 75. A subsequent PDU 63, 75 would have a sequence number value 51 of zero, due to rollover, and the encryption engine 66 would thus increment the HFN value 66*h* to one. Count-c, used to encrypt this subsequent PDU 63, 75, would thus be 128. The sequence number values 66*s* are transmitted with the respective PDUs 75, as they are unencrypted. The HFN value 66*h*, however, is not transmitted, and thus must remain synchronized on both the reception and transmission sides for the PDUs 75 to be properly decrypted.

Please refer to FIG. 6 in conjunction with FIG. 4. FIG. 6 is a diagram of transmission and reception of PDUs 82 and 92. PDUs 82, each with an indicated sequence number (SN) value, are transmitted from a transmission side 80. The PDUs 82 are then received on a receiver side 90 and assembled into PDUs 92, each with an indicated sequence number (SN). The transmission side 80 sends a first block of PDUs 82 with sequence numbers incrementing from 110 to 112. The transmission side then discards PDUs 82 with sequence numbers ranging from 113 to 125, indicated by the Xs 83, and continues transmitting with sequence number values from 126 to 1. Rollover of the 7-bit sequence numbers occurs after a value of 127. Again, PDUs 82 are discarded that have sequence number values from 2 to 19, indicated by Xs 84, then transmission continues with PDUs 82 having sequence number values incrementing from 20 to 23. More PDUs 82 are discarded, indicated by Xs 85, and transmission resumes with PDUs 82 having sequence number values beginning at 30. Discarding of the PDUs 83, 84 and 85 may occur at the transmission side 80 due to time-out errors, or for other reasons. The receiving side 90, however, is not directly informed of these PDU discards 83, 84 and 85, and infers them from the non-sequentiality of the sequence numbers in the received PDUs 92. For example, between received PDUs 93*a* and 93*b*, the receiving side 90 infers that the PDUs 83 have been discarded, and must react accordingly to properly reassemble the PDUs 92 into correct SDUs. At received PDU 96*b*, rollover occurs in the sequence numbers, and so the receiving side 90 increments its HFN 66*h* accordingly. Received PDU 96*b* thus uses a different HFN 66*h* for decryption than received PDU 96*a*. This is proper, as it tracks the HFNs 66*h* of the corresponding transmitted PDUs 86*a* and 86*b*. As noted previously, the synchronization of the HFN number 66*h* on the transmission side 80 with the reception side 90 is of critical importance for the proper decryption of the received PDUs 92.

Unfortunately, the transmission process is not error-free. PDUs 82 can get lost or corrupted. For example, on the reception side 90, a PDU 97 is received with an erroneous sequence number value of 100, instead of the correct sequence number value of 23 for the correspondingly transmitted PDU 87. A layer 1 circular redundancy check (CRC) should generally detect errors in the received PDUs 92 and discard any found to be corrupted. However, it is possible for some corrupted PDUs 92 to avoid detection, and, for the present example, we may imagine that the corrupted PDU 97 has been damaged in such a way as to result in the incorrect sequence number value of 100. On the reception side 90, we may imagine that the encryption engine 66 uses an HFN value of one to decrypt the PDU 98a. This is the same HFN value 66h that was used on the transmission side 80 to encrypt the PDU 88a, and so the received PDU 98a is properly decrypted. The corrupted PDU 97 will not be properly decrypted, however, as its sequence number value of 100 does not correspond to the sequence number value of 23 that was used to encrypt the transmitted PDU 87. The RLC layer 62 on the reception side will also assume that PDUs 82 with sequence number values ranging from 23 to 99 were discarded by the transmission side 80. This is incorrect. Worse still, though, is that upon reception of the PDU 98b, the encryption engine 66 on the reception side 90 will incorrectly assume that PDUs 82 on the transmission side 80 with sequence number values ranging from 101 to 127 and zero to 29 were discarded prior to transmission, or were lost in transmission. The encryption engine 66 on the reception side 90 will thus assume that rollover of the sequence numbers has occurred and increment its HFN value 66h accordingly. The reception-side 90 HFN value 66h will thus go from a value of one to a value of two. When the reception side 90 attempts to decrypt the received PDU 98b, an HFN 66h value of two will be used, which is out of synch with the HFN value 66h of one used on the transmission side 80. The PDU 98b will thus be improperly decrypted, resulting in a meaningless PDU 92. Additionally, as the HFN values 66h on the transmission side 80 and reception side 90 are no longer synchronized, all subsequent received PDUs 92 will also be improperly decrypted. The communications channel between the reception side 90 and transmission side 80 is effectively destroyed.

SUMMARY OF INVENTION

It is therefore a primary objective of this invention to provide a method for determining acceptable ranges of received sequence numbers in a wireless communications protocol.

Briefly summarized, the preferred embodiment of the present invention discloses a method for determining acceptable ranges of received sequence numbers in a wireless communications protocol. The wireless communications protocol utilizes protocol data units (PDUs) for transmitting and receiving service data units (SDUs). Each PDU has a sequence number of n bits for indicating a relative sequential ordering of the PDU in a transmitted or received stream of PDUs. A transmission time interval (TTI) is also used in which a predetermined number of PDUs are transmitted or received. PDUs are received within a TTI. A starting sequence number and an ending sequence number for received PDUs within the TTI are found. Any received PDU within the TTI that has a sequence number that is sequentially before the starting sequence number or that is sequentially after the ending sequence number is discarded.

It is an advantage of the present invention that by discarding PDUs in the TTI that have sequence number values that are not within the range of the starting and ending sequence numbers, loss of synchronization in the hyperframe numbers between transmitting and receiving stations is avoided. Additionally, the discarding of such PDUs helps to prevent the passing up to higher layers of corrupted data.

These and other objectives of the present invention will no doubt become obvious to those of ordinary skill in the art after reading the following detailed description of the preferred embodiment, which is illustrated in the various figures and drawings.

DETAILED DESCRIPTION

In the following description, a communications protocol as disclosed in the 3GPP™ specification TS 25.322, V3.5.0, is used by way of example. However, it should be clear to one in the art that any wireless communications protocol that suffers from data corruption of received protocol data units (PDUs) may utilize the discarding method of the present invention. It should be further noted that a station in the following description could be both a transmitter and receiver of information. Such a station might be a cellular telephone, a personal data assistant (PDA), a personal computer (PC), or any other device that utilizes the wireless communications protocol.

Figure 7:
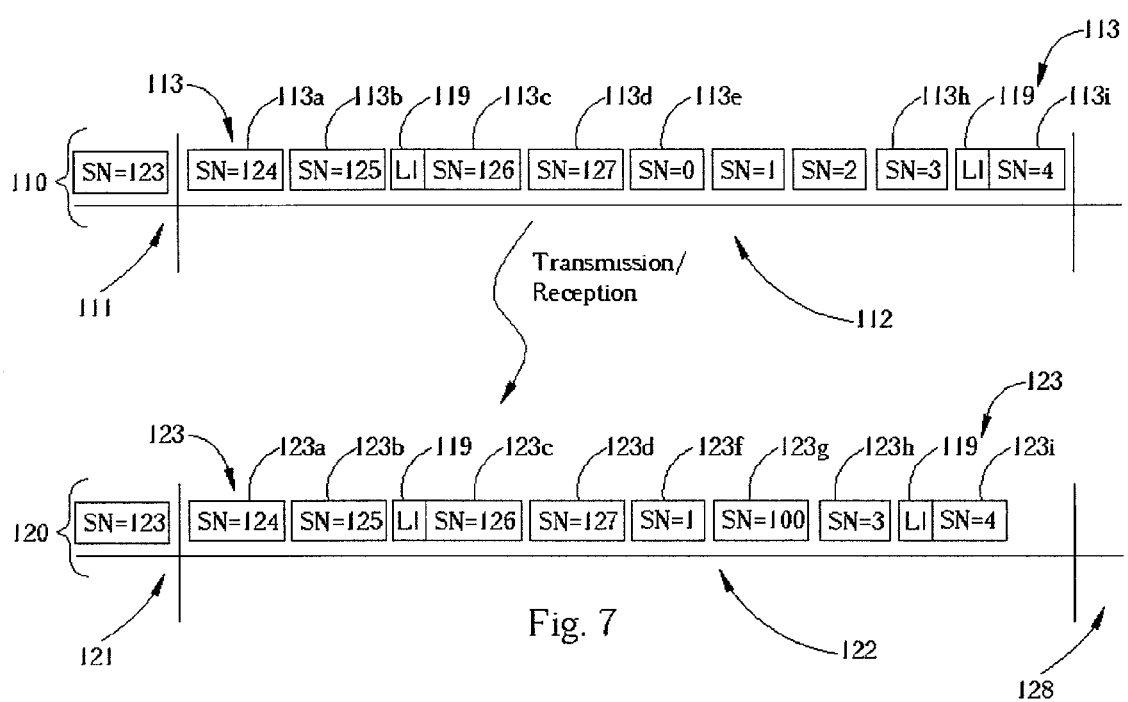
FIG. 7 is a diagram of transmission and reception of PDUs according to a first embodiment of the present invention.
Figure 8:
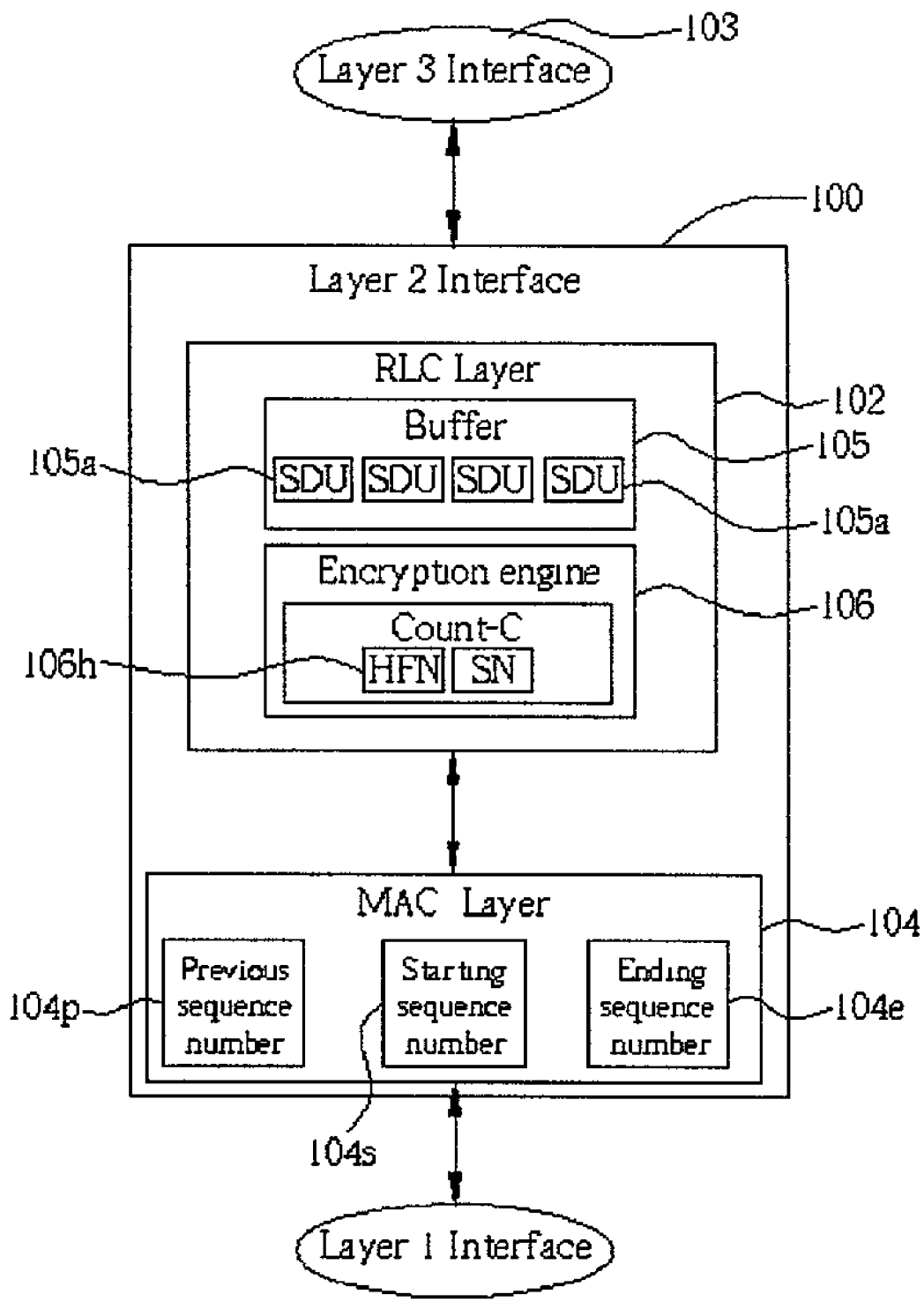
FIG. 8 is a block diagram of a layer 2 interface according to the first embodiment of the present invention.

It is the method of the present invention to ensure that all received protocol data units (PDUs) within a transmission time interval (TTI) have sequence number (SN) values that are sequentially within a predetermined range for the TTI. Please refer to FIG. 7 and FIG. 8. FIG. 7 is a diagram of transmission and reception of PDUs 113 and 123 according to a first embodiment of the present invention. FIG. 8 is a block diagram of a layer 2 transmission/reception interface 100 of the present invention. Except where noted, PDUs, service data units (SDUs) and TTIs of the present invention are as described in the Description of the Prior Art. Additionally, encryption of the PDUs, and the use of hyper-frame numbers (HFNs) and sequence numbers for the encryption/decryption process are as described in the prior art. To illustrate the method of the present invention, a simple example is presented. A layer 2 interface 100 on a transmission side 110 receives a string of SDUs 105a from a layer 3 interface 103. The SDUs 105a are held in a buffer 105, awaiting transmission. Due to time-out, some of the SDUs 105a are discarded, and hence are never transmitted. The medium access control (MAC) layer 104 informs the radio link control (RLC) layer 1-2 of the number and size of PDUs 113 for an impending TTI 112. For the present example, we assume that the TTI 112 is to deliver nine PDUs 113. The last sequence number used in a previous TTI 111 on the transmission side 110 held a value of 123. The RLC layer 102 thus increments the value of 123 by one to obtain a value of 124 for the sequence number of the first PDU 113a in the impending TTI 112. Successive PDUs 113 have incrementally higher sequence number values, regardless of whether or not SDUs 105a were discarded between successive PDUs 113. That is, each successive PDU 113 in the TTI 112 has a sequence number value that is always one higher than the previous PDU 113. Thus, the PDU 113b has a sequence number value of 125. Similarly, the PDU 113c has a sequence number value of 126. The PDU 113c, however, also utilizes a special length indicator (LI) 119. In order to enable the receiving side 120 to know that PDUs have been discarded by the transmission side 110 layer 2 interface 100 prior to transmission, the special LI 119 is used. The special LI 119 indicates that PDUs were discarded between the PDU 113b and the PDU 113c prior to transmission. A subsequent PDU 113d has a sequence number of 127. The encryption engine 106 on the transmission side 110 uses a hyper-frame number (HFN) 106h and the individual sequence numbers of the PDUs 113a–113d to encrypt the PDUs 113a–113d. Sequence number rollover occurs for the PDU 113e, and thus the HFN 106h is incremented. The PDU 113e uses the new HFN 106h for encryption, as do all subsequent PDUs 113. PDUs 113 were also discarded between PDUs 113h and 113i, and thus the PDU 113i utilizes the special LI 119 to indicate this.

The transmission side 110 transmits the PDUs 113 in the TTI 112 and the PDUs 113 are received in part by the receiving side 120, which generates received PDUs 123 for the reception-side TTI 122. The discarding method of the present invention may be utilized in either the MAC layer 104 or the RLC layer 102. For purposes of the present discussion, it is assumed that the present invention method is performed in the MAC layer 104. The reception-side 120 MAC layer 104 uses a previous sequence number value 104p to generate a starting sequence number value 104s. The highest expected sequence number value in the previous TTI 121 was a value of 123. That is, an ending sequence number value 104e for the previous TTI 121 held a value of 123. This value is incremented by one to obtain a value of 124 for the starting sequence number value 104s for the current TTI 122. The starting sequence number value 104s should thus be equal to the sequence number value of the first transmitted PDU 113a. The receiving side 120 MAC layer 104 knows that nine PDUs are to be received for the TTI 122, and uses this information to generate an ending sequence number value 104e. The ending sequence number value 104e is simply the starting sequence number value 104s plus the number of PDUs 123 expected in the TTI 122 minus one. For this example, then, the ending sequence number value is 124+9−1=4 (due to rollover of the 7-bit sequence number). The receiving side 120 MAC layer 104 will discard any received PDU 123 within the TTI 122 that does not have a sequence number that is sequentially within the bounds of the starting sequence number 104s and the ending sequence number 104e. Note that, due to the rollover of the sequence numbers, care must be taken to properly determine whether or not a sequence number is within the acceptable bounds. For the example at hand, only sequence numbers within the set (124, 125, 126, 127, 0, 1, 2, 3, 4) are acceptable. All other sequence numbers for the received PDUs 123 result in a discarding of the associated PDU 123.

The first received PDU 123a has a sequence number value of 124, and so is accepted. The same holds true for the second and third PDUs 123b and 123c, respectively. The PDU 123c contains the special LI 119. The receiving side 120 thus knows that PDUs 113 were discarded by the transmitting side 110 between the received PDUs 123b and 123c, and behaves accordingly when assembling the PDUs 123 into corresponding SDUs. Although the transmitted PDU 113e is completely missed on the receiving side 120, the receiving side 120 can correctly infer sequence number roll-over from the sequence number values held within the PDUs 123d and 123f. Both the PDU 123d and the PDU 123f have sequence number values that land within the acceptable range, as defined by the starting sequence number value 104s and ending sequence number value 104e, and so are accepted. As the sequence number value of the PDU 123f is less than the sequence number value for the PDU 123d, rollover of the sequence numbers is inferred, and the HFN 106h on the receiving side is incremented accordingly. Decryption of the PDU 123f is thus successfully performed with the new HFN 106h value. Non-sequentiality between the sequence numbers for the PDUs 123d and 123f implies that the PDU 113e was lost in transmission, and the receiving side 120 may react accordingly when assembling the PDUs 123d and 123f into corresponding SDUs. A corrupted PDU 123g is also received within the TTI 122. The corrupted PDU 123g, however, does not have a sequence number that lands within the acceptable range. The corrupted PDU 123g is thus discarded, and the HFN 106h on the receiver side is not modified. A subsequent PDU 123h is thus properly decrypted using a receiving side 120 HFN 106h value that is synchronized with the transmission side HFN 106h value. That is, the discarding of the corrupted PDU 123g prevents the transmission side 110 from becoming unsynchronized with the receiving side 120. A final received PDU 123i is thus also properly decrypted, as are all subsequent PDUs in a subsequent TTI 128.

Because the present invention uses a special LI 119 to indicate the transmission-side 110 discarding of PDUs 113, it is possible to ensure that the transmitted PDUs 113 all have sequence numbers that ascend without jumps or gaps. The receiving side 120 can use this information to discard any PDU 123 that is not within the expected range of sequence numbers for the current TTI 122. Additionally, as all PDUs 123 should have a proper sequential ordering, it is possible to discard any PDU 123 as corrupted that does not adhere to the sequential ordering of the previously received PDUs 123, even though the sequence number of the PDU 123 may be within the range of acceptable sequence numbers. For example, if the PDU 123h had a sequence number of two instead of three, the MAC layer 104 may still discard the PDU 123h as unacceptable as it is clear that the PDU 123h, based upon its position within the TTI 122, should have a sequence number value of three. This enables additional stringency on the acceptance of received PDUs 123.

Figure 9:
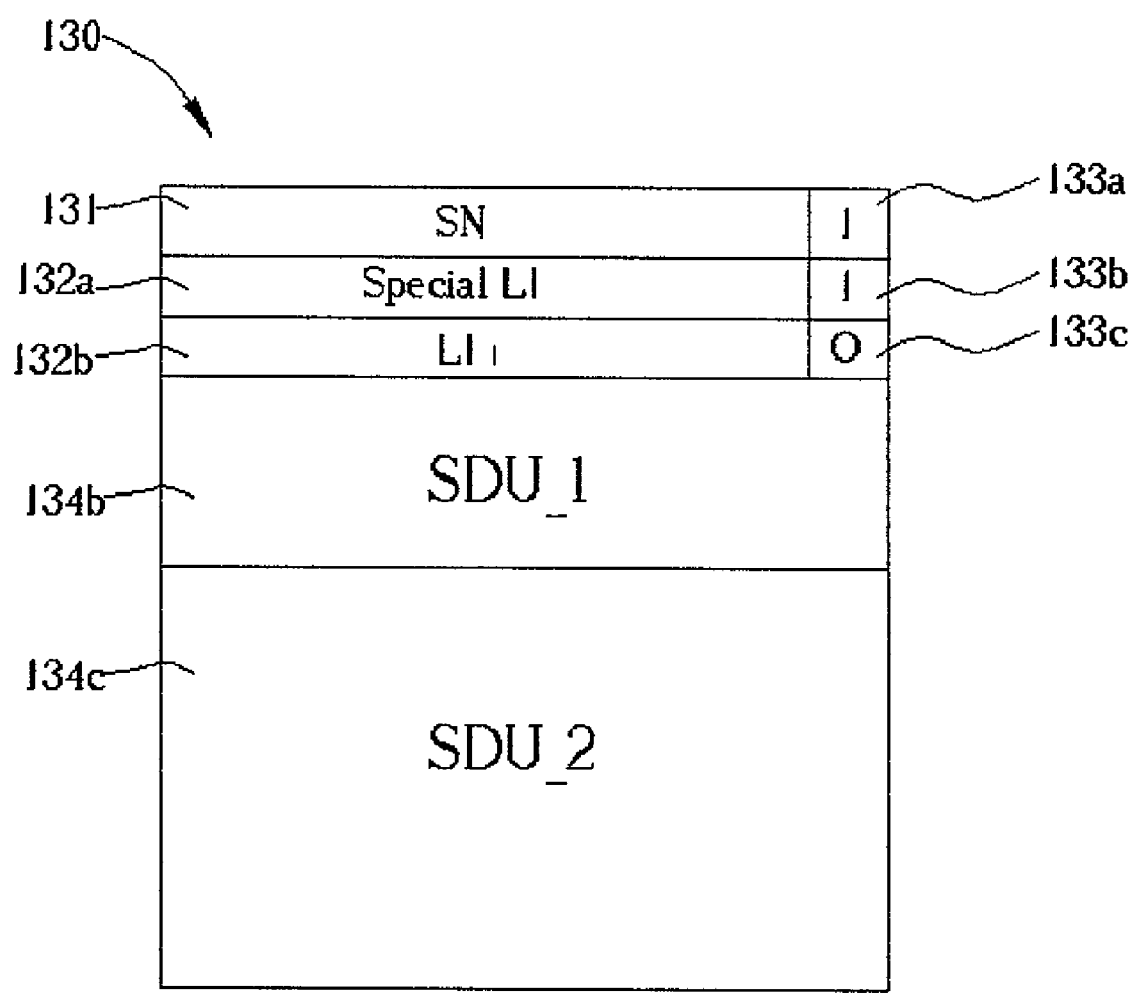
FIG. 9 is a block diagram of an example PDU according to the present invention.

In the above description, it should not be inferred that PDUs 113,123, other than those with the special LI 119, have no LIs themselves. Quite the opposite is true. Every transmitted PDU 113 and received PDU 123 is capable of holding one or more LIs, as explained in the Description of the Prior Art. Such LIs are necessary to properly reconstruct SDUs from the received PDUs 123. The above description simply indicates the novel LI 119 of the present invention, and ignores, for the sake of brevity, any other acceptable and possible LIs within the PDUs 113, 123. To better illustrate the LIs of the present invention, please refer to FIG. 9. FIG. 9 is a block diagram of an example PDU 130 according to the present invention. The PDU 130 uses a special LI 132a to indicate that PDUs immediately prior to the PDU 130 were discarded prior to transmission. The first octet of the PDU 130 includes a 7-bit sequence number (SN) field 131 and a single extension bit 133a. The extension bit 133a indicates the presence of a following LI, when set. In the preferred embodiment, the special LI 132a is the first LI in the PDU 130, and is a value that exceeds the maximum possible length of the PDU 130. Other positions of the special LI 132a are, of course, possible. The special LI 132a may be either 7 or 15 bits in length, and is followed by a single extension bit 133b to indicate the presence or absence of a following LI. The extension bit 133b is set to indicate the presence of a subsequent LI, LI$_1$ 132b. LI$_1$ 132b indicates the end of SDU_1 134b. As there are no more LIs in the example PDU 130, the extension bit 133c for LI$_1$ 132b is cleared. The LI for SDU_2 134c will be found in a PDU that follows the PDU 130.

It is worth noting that the data in SDU_1 134b must be assumed to be the end of the data that was contained in the PDUs that were discarded on the transmission side prior to the PDU 130. Thus, the data in SDU_1 134b should also be discarded. Data from previously received PDUs may also have to be discarded, as it may mark the beginning of data that spans into the PDUs discarded on the transmission side. Reassembly of PDUs into SDUs is, consequently, not a straightforward task, and requires some care. Note that LI$_1$ 132b might have a value of zero to indicate that no data is to be discarded from the PDU 130. Alternatively, two values may be utilized for the special LI 132a: The first value may indicate that data is to be discarded from the PDU 130, and the second value would indicate that no data is to be discarded from the 130.

Figure 1:
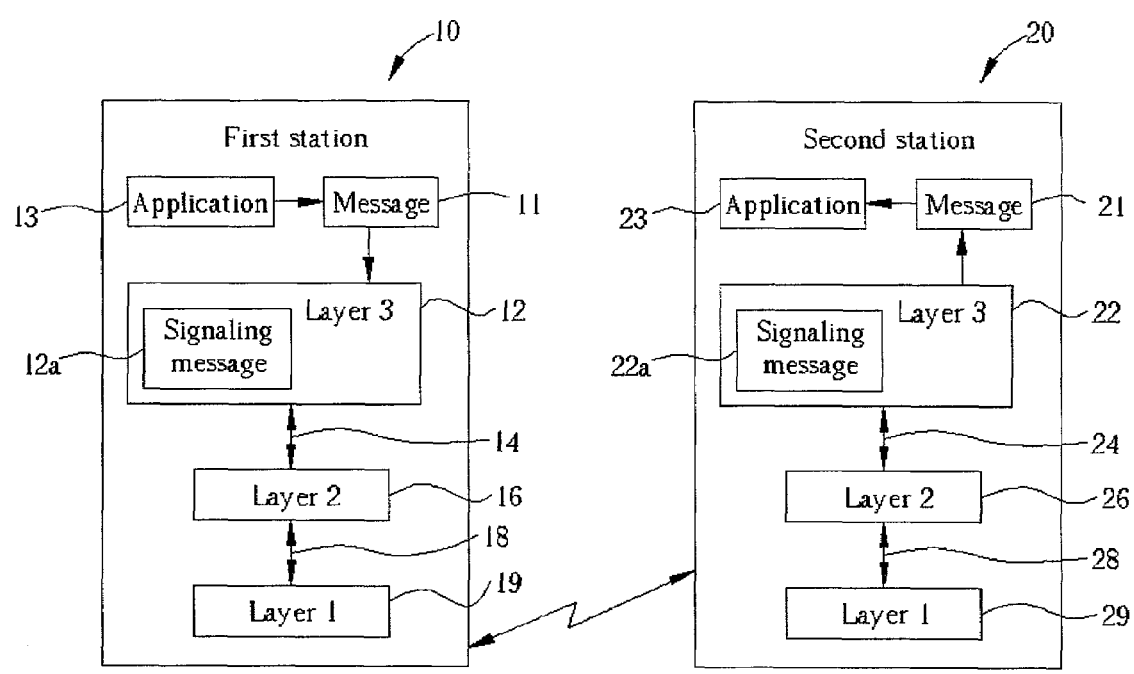
FIG. 1 is block diagram of a three-layer communications protocol.
Figure 2:
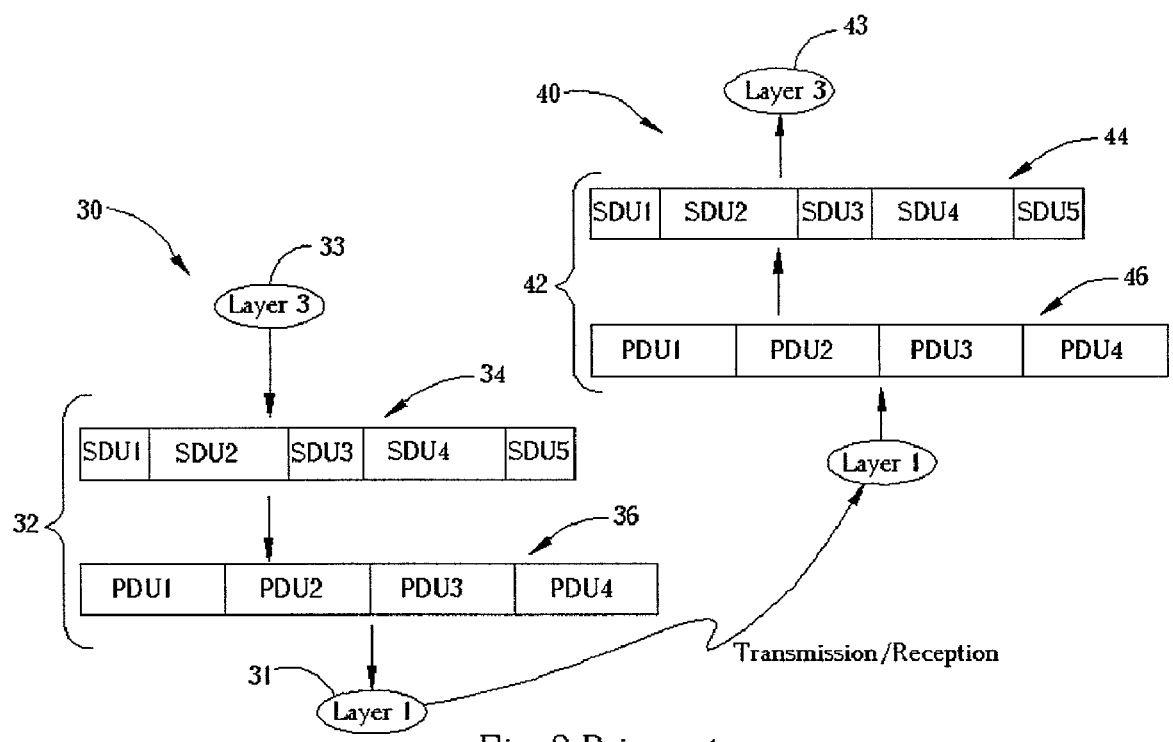
FIG. 2 is a simplified diagram of a transmission/reception process from a layer 2 perspective.
Figure 3:
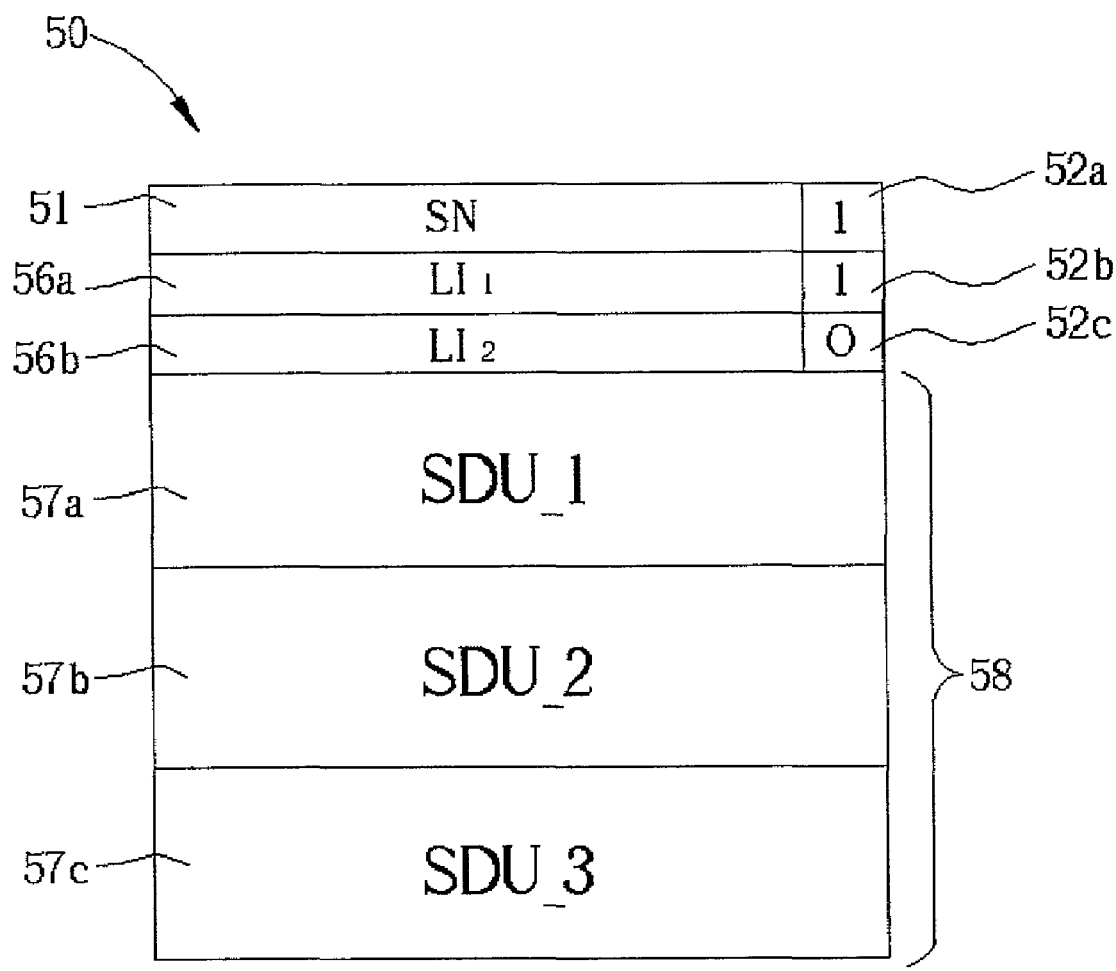
FIG. 3 is a block diagram of an unacknowledged mode data (UMD) protocol data unit (PDU).
Figure 4:
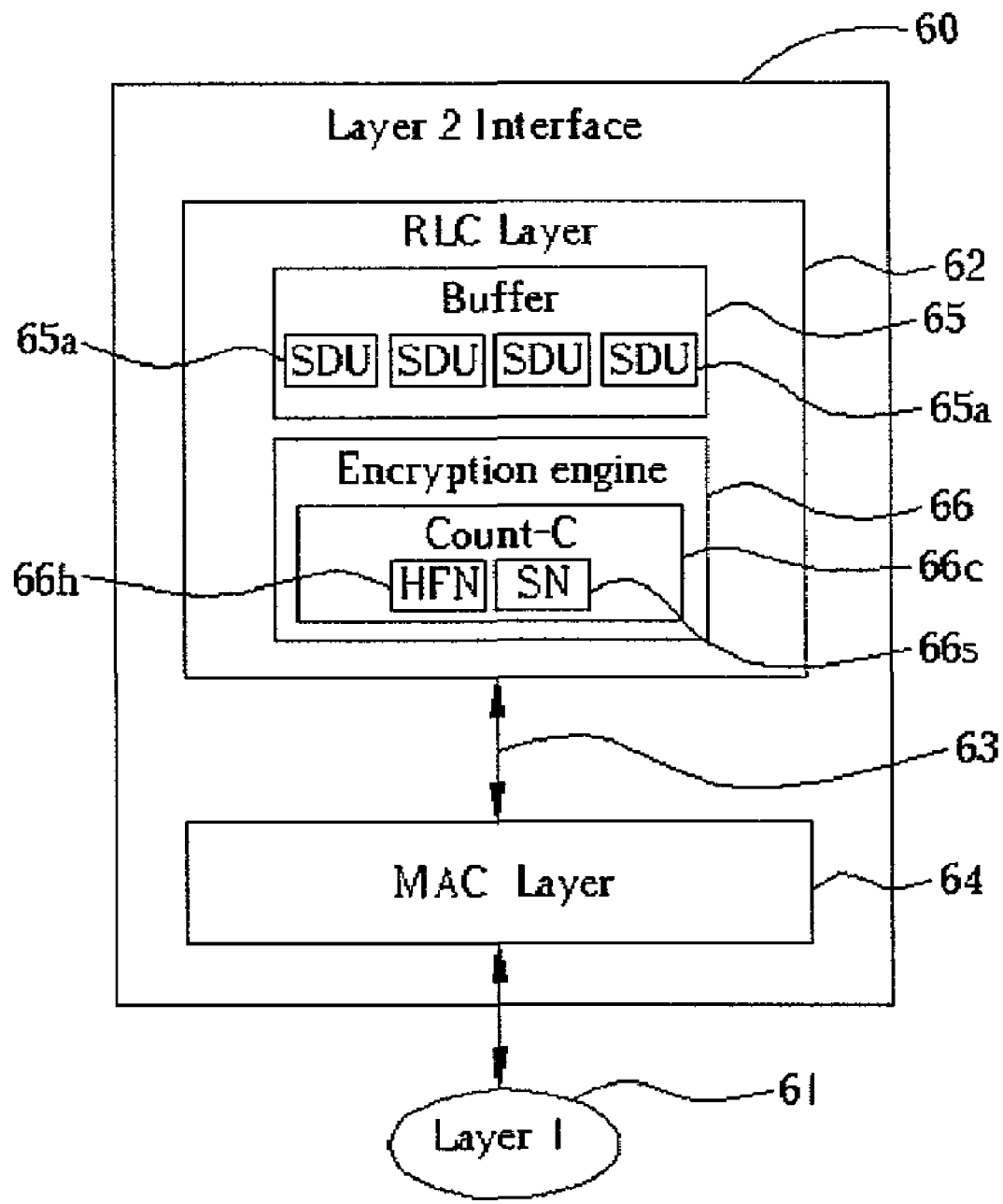
FIG. 4 is a more detailed block diagram of a prior art layer 2 interface.
Figure 5:
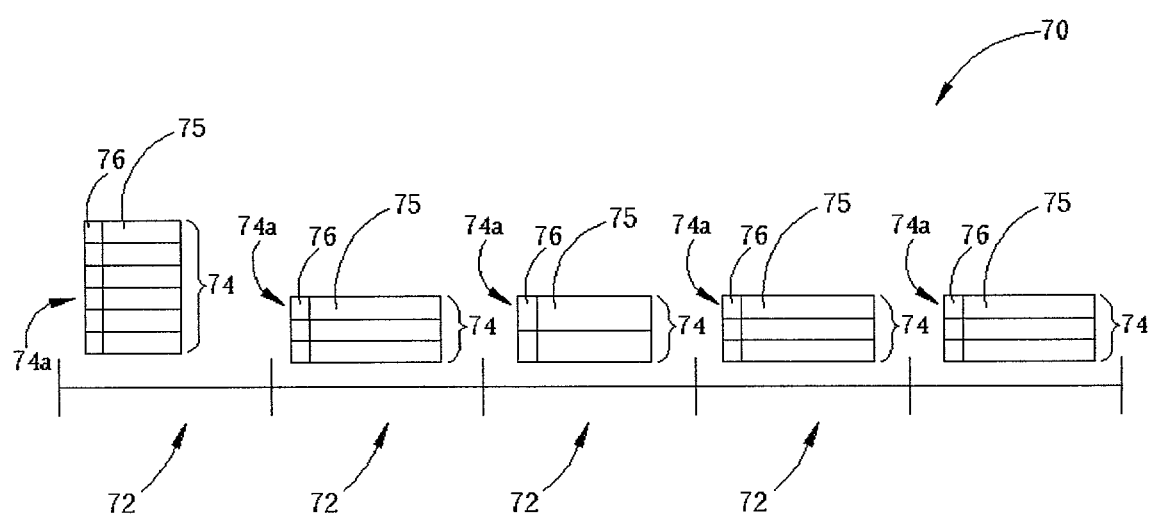
FIG. 5 is a timing diagram of transmission time intervals (TTIs).
Figure 6:
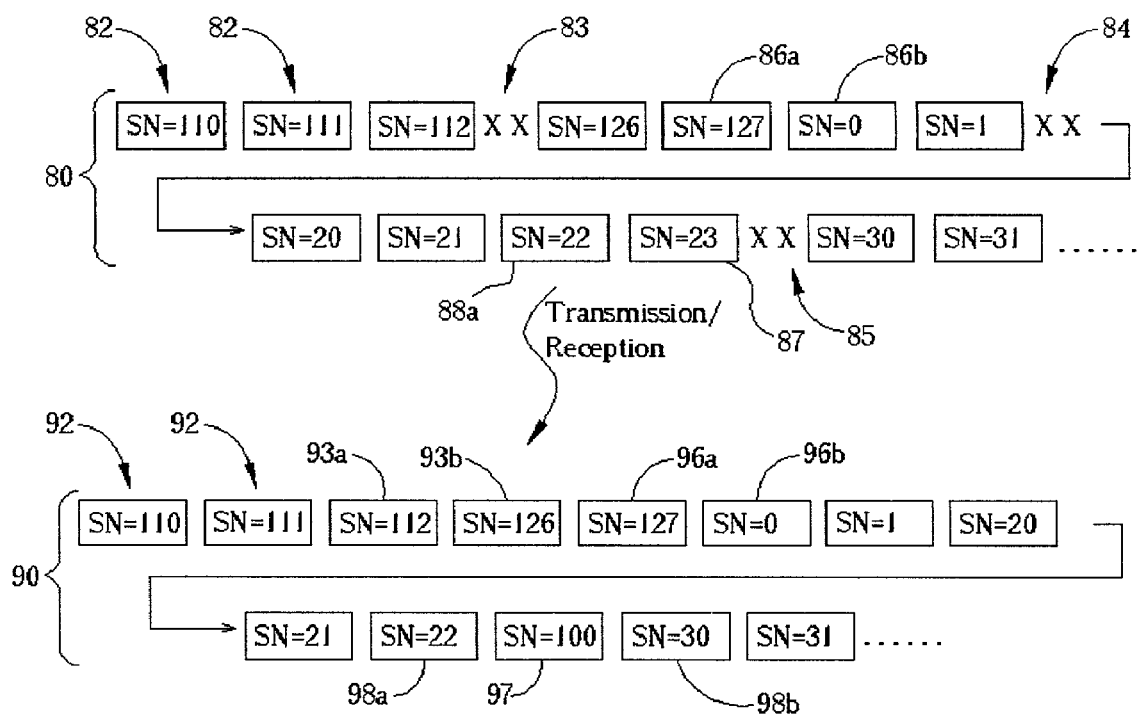
FIG. 6 is a diagram of transmission and reception of PDUs according to the prior art.

In another embodiment of the present invention, rather than using the special LI 119 to indicate that PDUs were discarded by the transmitter 110, it is instead possible to use the sequence numbers 131 as a flag. The general idea of the second embodiment is that sequence numbers (SNs, as per item 51 of FIG. 3) are to advance in a regular manner, preferably by increments of one, except to signal discarded PDUs, in which case the next transmitted PDU is transmitted with an SN 51 incremented by another number, preferably by two. By knowing the number of PDUs expected in a TTI, a maximum value can be set for any SN in that TTI. Further, by parsing the SNs of PDUs with respect to the received position of the PDU it is possible to determine if the SN has been corrupted, if a previous PDU had been discarded without transmission, or if a previous PDU was lost entirely in transmission.

Figure 10:
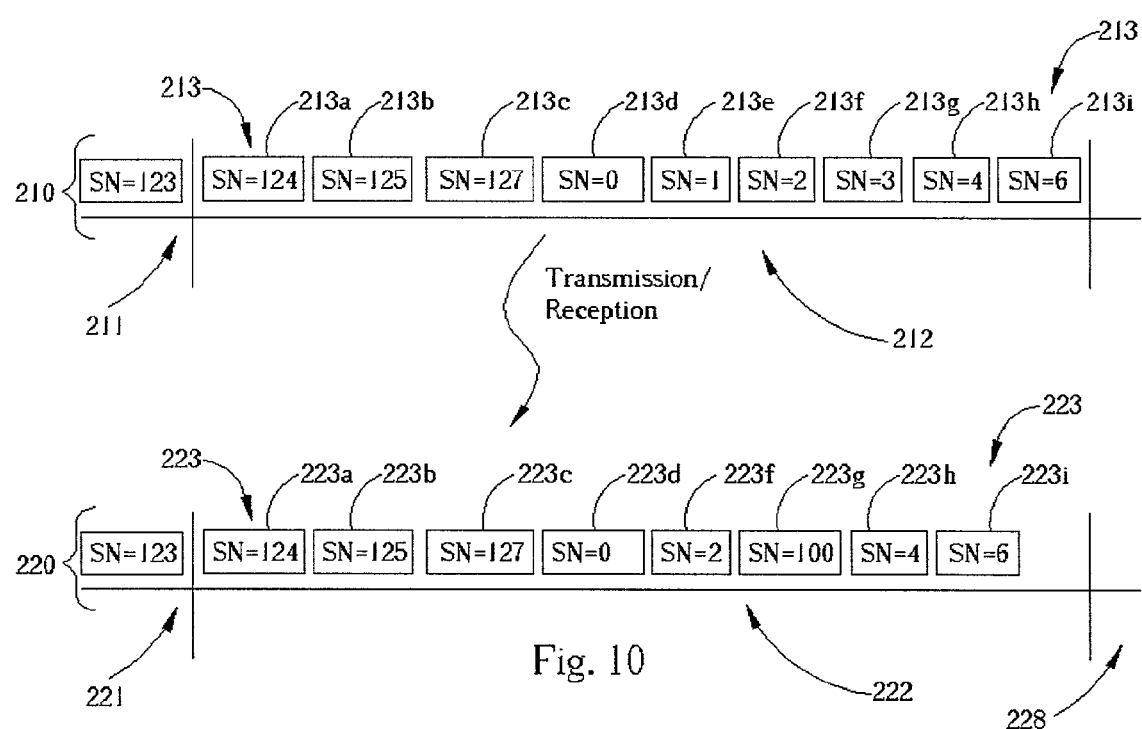
FIG. 10 is a diagram of transmission and reception of PDUs according to a second embodiment of the present invention.
Figure 11:
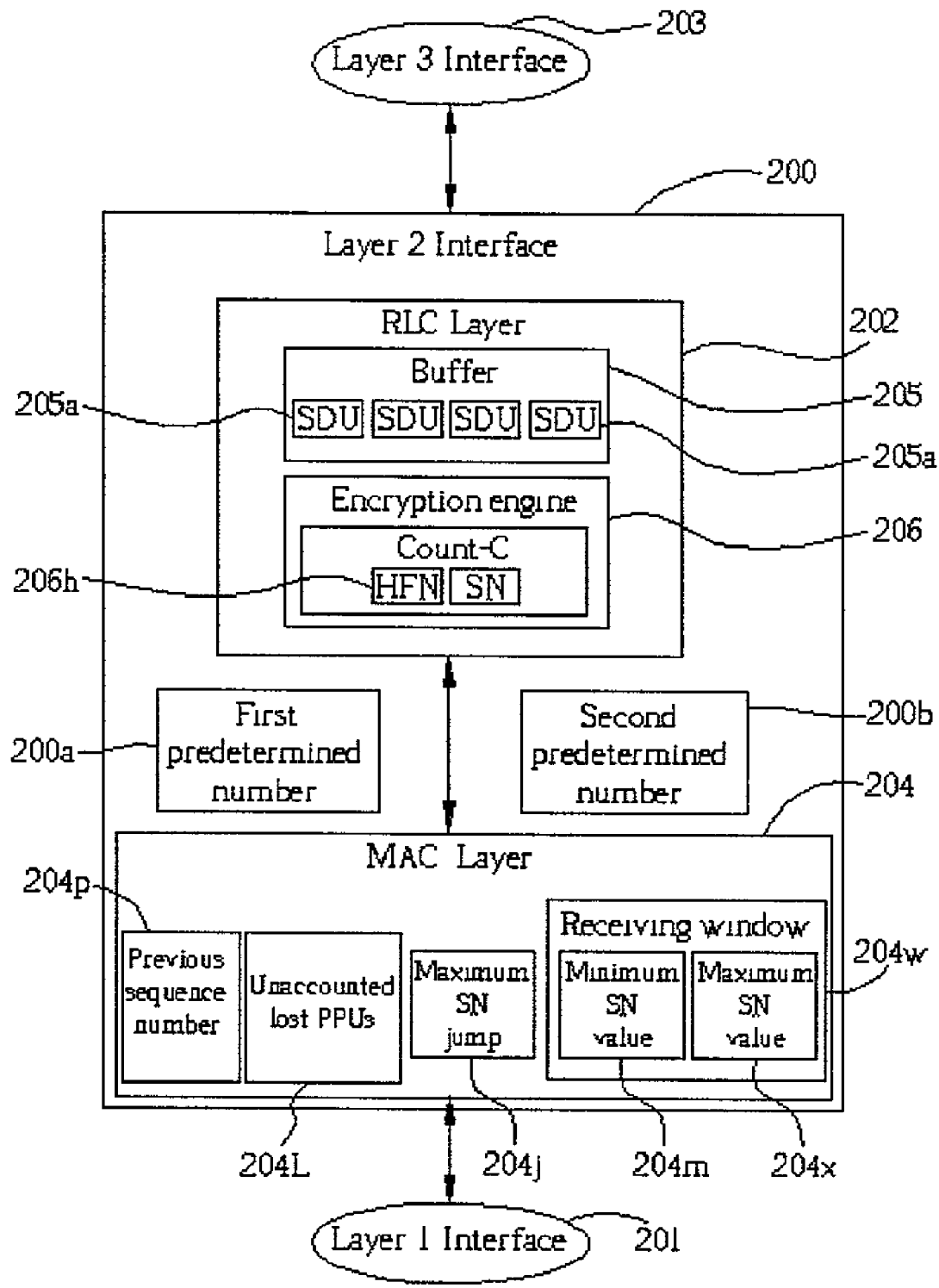
FIG. 11 is a block diagram of a layer 2 interface according to the second embodiment of the present invention.

For an example of this, please refer to FIG. 10 and FIG. 11. FIG. 10 is a diagram of transmission and reception of PDUs 213 and 223, respectively, according to a second embodiment of the present invention. FIG. 11 is a block diagram of a layer 2 interface 200 for a transmitter/receiver according to the second embodiment of the present invention. The layer 2 interface 200 includes an RLC layer 202 and a MAC layer 204. The RLC layer 202 receives layer 2 SDUs 205a from a layer 3 interface 203, which are stored in a buffer 205. The RLC layer 202 uses the SDUs 205a to assemble layer 2 PDUs 50, giving each an SN 51 according to the method of the present invention. An encryption engine 206 is then used to encrypt the PDUs according to an HFN 206h and the SN 51 of the PDU 50. Encrypted PDUs are then passed to the MAC layer 204 for transmission. Although the encryption engine 206 is shown in the RLC layer 202, it is fully possible for the encryption engine 206 to be part of the MAC layer 204. If that is the case, then it is also possible for the MAC layer 204 to assign SNs 51 to each PDU 50 according to the method of the present invention. In either case, it is essential that the SN 51 used to encrypt a PDU 50 be the same SN 51 that is actually transmitted with the PDU 50. The MAC layer 204 receives PDUs in a TTI from a layer 1 interface 201, and may optionally discard any of the PDUs so received that do not conform to an expected spread of SN values 51. The remaining PDUs are then passed up to the RLC layer 202 for decryption and assembly into SDUs 205, which are then passed to the layer 3 interface 203.

The second embodiment method of the present invention is illustrated by example in FIG. 10, showing a transmitting side 210 and a corresponding receiving side 220. For a TTI 212 to be processed on the transmitting side 210, the MAC layer 204 informs the RLC layer 202 of the number of PDUs 213 required for transmission; in this case nine PDUs 213. The RLC layer 202 uses the SDUs 205a to construct the PDUs 213, sequentially assigning SNs 51 to each PDUs 213 that either advance by a first predetermined value 200a or a second predetermined value 200b to signal either that there are no intervening discarded PDUs, or that intervening PDUs were discarded by the transmitting side 210, respectively. The first predetermined value 200a is ideally one, and the second predetermined value 200b is ideally two. Assuming that no PDUs 213 have been discarded between the current TTI 212 and a previous TTI 211, a first PDU 213a in the TTI 212 is assigned an SN value of 124, which is one greater than the highest SN value in the previous TTI 211, which was 123, and which was the immediately prior transmitted PDU of the PDU 213a. A second PDU 213b immediately subsequent the first PDU 213a is assigned an SN value of 125, which is one greater than that of the first PDU 213a, thereby indicating that there are no discarded PDUs between the first PDU 213a and the second PDU 213b. However, a third PDU 213c, immediately after the second PDU 213b, is assigned an SN value of 127, which is two greater than that for the second PDU 213b; this signals that there were PDUs discarded by the transmitting side 210 between the second PDU 213b and the third PDU 213c. After the third PDU 213c, the next five PDUs 213 are contiguous, i.e., that there are no discarded PDUs between any of them, and so all of their SN values are each off by one with respect to their immediate neighbors. Thus, a fourth PDU 213d has an SN value of zero, which is one greater than the SN value of 127 of the third PDU 213c, due to roll-over of the 7-bit SN. A fifth PDU 213e has an SN value of one, a sixth PDU 213f has an SN value of two, a seventh PDU 213g has an SN value of three, and an eighth PDU 213h has an SN value of four. However, the transmitting side 210 discarded PDUs between the eighth PDU 213h and a ninth PDU 213i. Consequently, the SN value of the ninth PDU 213*i* is two greater than that of the previous PDU 213*h*, yielding an SN value of six. The PDUs 213 are then encrypted by the encryption engine 206 according to their respective SN values and associated HFN 206*h* values. If we assume that the HFN 206*h* was originally zero, then PDUs 213*a*, 213*b* and 213*c* are encrypted with an HFN value of zero, whereas PDUs 213*d*, 213*e*, 213*f*, 213*g*, 213*h* and 213*i* are encrypted with an HFN value of one, due to roll-over of the SN values with PDU 213*d*. The encrypted PDUs 213 are then passed to the MAC layer 204 for transmission in the TTI 212.

On the receiving side 220, the transmitted PDUs 213 are received in a TTI 222 as received PDUs 223. In the TTI 222, the receiving side 220 was expecting nine PDUs 223, but has only received eight PDUs 223. It is clear, then, that one PDU 223 was lost in the transmission/reception process. The MAC layer 204 evaluates the SN values of the received PDUs 223 to determine if any of the PDUs 223 were corrupted in transmission and escaped the CRC check of the layer 1 interface 201. In particular, the MAC layer 204 is aware of the method used to encode the SN values of the PDUs 223, and expects the PDUs 223 to have SN values that correspond to such an encoding scheme. In particular, the MAC layer 204 recalls a previous SN value 204*p*, which is the highest SN value received in a previous TTI 221, and recalls unaccounted lost PDUs 204L from the previous TTI 221. Using these values, the MAC layer 204 obtains a minimum SN value 204*m* and a maximum SN value 204*x* to define a receiving window 204*w*. Any PDUs 223 with SN values that are not within the range specified by the minimum SN value 204*m* and the maximum SN value 204*x*, i.e., not within the receiving window 204*w*, are discarded as being corrupt. The minimum SN value 204*m* and the maximum SN value 204*x* are computed using the following formulas:

$$\text{minimum } SN \text{ value} = \text{previous } SN \text{ value} + a;$$

$$\text{maximum } SN \text{ value} = \text{previous } SN \text{ value} + (x+I)*b;$$

where "a" is the first predetermined value 200*a* that is used to increment SN values when there are no intervening discarded PDUs, "x" is the number of PDUs expected in the current TTI, "I" is the unaccounted lost PDUs 204L from the previous TTI 221, and "b" is the second predetermined number 200*b* that is used to increment SN values when there are intervening discarded PDUs. It should be noted that the above is a true bit-wise addition, and so roll-over is possible. In other words, the minimum SN value 204*m* and the maximum SN value 204*x* are all mod $2^n$, where "n" is the bit-size of the SN values of the PDUs 223 (item 51 of FIG. 3).

For the present example, "a" is one and "b" is two. If we assume that no PDUs were lost in the previous TTI 221, then "I" is zero. The MAC layer 204 thus computes the minimum SN value 204*m* as 124, and computes the maximum SN value 204*x* as 13. Any PDUs 223 with SN values that are not within the range (124 . . . 13) of the receiving window 204*w* are discarded as corrupt. Again, it is worth noting that due to roll-over of SN values, higher SN values can be sequentially before numerically lower values. For example, in the case as shown in FIG. 10, an SN value of 127 is sequentially before that of zero, whereas zero is before an SN value of one. Additionally, any PDUs 223 with values that are not sequentially greater than those of the preceding PDU 223 are discarded as corrupt.

In the TTI 222, a first PDU 223*a* has an SN value of 124, which is equal to the minimum SN value 204*m*, and so is accepted. With each accepted PDU 223, the minimum SN value 204*m* is advanced according to the formula:

$$\text{minimum } SN \text{ value} = SN + a;$$

Where, "SN" is the SN value 51 of the accepted PDU 223, and, as before, "a" is the first predetermined value 200*a* (i.e., one). In this manner, the receiving window 204*w* is constantly narrowing. After accepting the first PDU 223*a*, the minimum SN value is then 125.

A second PDU 223*b*, immediately after the first PDU 223*a*, has an SN value of 125, which is one greater than the previous SN value of 223, is within the receiving window 204*w*, and so is accepted. The minimum SN value 204*m* is advanced to 126, further narrowing the receiving window 204*w*. A third PDU 223*c*, immediately after the second PDU 223*b*, has an SN value of 127, which is two greater than that of the previous PDU 223*b*. It is worth noting here that the MAC layer 204 can also maintain a maximum SN jump value 204*j*, which is the greatest permissible jump between immediately successive PDUs 223, and which is given by:

$$\text{Maximum } SN \text{ jump} = (1+q)*b,$$

where "q" is the number of PDUs 223 known to be lost in the transmission/reception process of the current TTI and unaccounted for. In effect, "q" is the unaccounted lost PDUs 204L for the current TTI 222. After computing the maximum SN value 204*x*, the MAC layer 204 no longer requires the unaccounted lost PDUs value 204L from the previous TTI 221, and so may replace it with "q". "b" is the second predetermined value 200*b*. For the present example, "b" is two and "q" is one, so that the maximum SN jump 204*j* is four. Any PDU 223 having an SN value that exceeds the SN value of its immediate predecessor by anything greater than the maximum SN jump 204*j* can be discarded as a corrupted PDU 223. This simply follows from the encoding method used for the SN values on the transmitting side 210. The third PDU 223*c* has an SN value that is within both the receiving window 204*w*, and which is within the jump of SN values permitted by the maximum SN jump 204*j*. The third PDU 223*c* is thus accepted, and the minimum SN value 204*m* is set to one greater than the SN value of the accepted third PDU 223*c*, i.e., to 0 (due to roll-over), further narrowing the receiving window 204*w* for the current TTI 222. Generally, any SN values within the PDUs 223 that have increments that are greater than or equal to 2*b (i.e., twice the second predetermined number 200*b*) indicate that at least one intervening PDU was lost in the transmission/reception process. The unaccounted lost PDUs value 204L (i.e., term "I" in the equation used to derive the maximum SN value 204) can be reduced by at least one each time such a lost PDU is accounted for, thus ensuring a narrowed receiving window 204*w* for the next TTI 228. Note that this in effect reduces the term "q" used to find the maximum SN jump 204*j*, and thus reduces the maximum SN jump value 204*j* for the current TTI 222. To err on the side of caution, it is better to assume that SN values always increase by the second predetermined number 200*b* (i.e., two), rather than the first predetermined number 200*a* (i.e., one) when attempting to determine the upper extent of potential SN values. In the present case with the third PDU 223*c*, the SN value has jumped by two, which is not sufficiently large to know with certainty that an intervening PDU was lost in transmission. On the contrary, with the benefit of knowledge of the transmission side 210, which the receiving side 220 does not have, we know that there are, in fact, no other transmitted PDUs 213 between the PDUs 213*b* and 213*c*. Hence, it is always better to err on the side of caution as regards potential extents of SN values when performing SN integrity analysis on the receiver side 220. As the SN jump between the second PDU 223b and the third PDU 223c is not at least 2*b (i.e., four), the maximum SN jump value 204j is kept the same, as is the value for unaccounted lost PDUs 204L. A fourth PDU 223d, with an SN value of zero, is within the receiving window 204w, and within the maximum SN jump limit 204j, and so is accepted. The same is true for a fifth PDU 223f. The receiving side 220 is unable to determine that the transmitted PDU 213e was lost in the reception process, but the non-contiguous nature of the SN values between the fourth PDU 223d and the fifth PDU 223f at least indicates that data was discarded between the two PDUs 223d and 223f. A sixth PDU 223g is discarded by the MAC layer 204 on two grounds: first, the PDU 223g is not within the current bounds of the receiving window 204w, which now spans the set of SN values (3 . . . 13), and secondly, the SN value of 100 for the sixth PDU 223g is a jump of 98 from the fifth PDU 223f, far exceeding the maximum SN jump limit 204j of four. Nevertheless, the minimum SN value 204m can be advanced by the first predetermined value 200a (one), setting a lower limit of four for a seventh PDU 223h immediately after the corrupted and discarded sixth PDU 223g. Both the seventh PDU 223h, and an eighth PDU 223i are accepted in due course, as each lies within its respective receiving window 204w, and does not have an SN value that exceeds the maximum SN jump limit 204j. At the end of this SN evaluation process, the MAC layer 204 will have thrown out PDU 223g as corrupted, will have a previous SN value 204p of 6, and an unaccounted lost PDU value 204L of 1. The previous SN value 204p and unaccounted lost PDU value 204L will be used to set the receiving window 204w of the next TTI 228. Received PDUs 223a, 223b, 223c, 223d, 223f, 223h and 223i are passed up to the RLC layer 202 for decryption and assembly into SDUs 205a. During the assembly process, the RLC layer 202 assumes that any non-contiguous SN values (i.e., SN values that advance by anything greater than the first predetermined number 200a) indicate that data has been lost or discarded. Note that since PDU 223g was discarded, the HFN 206h on the receiving side 220 will remain synchronized with the HFN 206h on the transmitting side, and hence the PDUs 223h and 223i will be properly decrypted. If the PDU 223g had been passed to the RLC layer 202, the RLC layer 202 would incorrectly advance the HFN 206h for the PDUs 223h and 223i. By discarding PDU 223g, this problem is avoided.

Many minor variations and additions to this second embodiment are possible. For example, rather than having the MAC layer 204 perform the SN value analysis, it is fully possible to have the RLC layer 202 perform the analysis. Additionally, when computing the upper limit of the receiving window 204w, i.e., the maximum SN value 204x, some may prefer to simply ignore the unaccounted lost PDUs term 204L. One and two are considered the best respective choices for the first predetermined number 200a and second predetermined number 200b, as they ensure that reuse of sequence numbers is kept to a bare minimum. However, others values are certainly possible, though ideally the second predetermined number 200b should be numerically larger than the first predetermined number 200a. Also, it is possible to recalculate the maximum SN value 204x with each parsing of PDUs 223 so that the upper limit of the receiving window 204w is constantly reducing. That is, once a PDU 223 is found to be within the receiving window 204w, the maximum SN value 204x can be recalculated as:

$$\text{maximum } SN \text{ value} = SN \text{ value} + (x-y)*b;$$

Where "SN value" is the SN value of the PDU 223 found to be within the receiving window 204w, "x" is the number of PDUs expected within the TTI 222, "y" the number of PDUs 223 that have been parsed and accounted for, and "b" is the second predetermined number 200b. For example, if three PDUs 223 had already been parsed at the time of recalculation, and another lost PDU 223 had been accounted for, then "y" would hold a value of four.

Figure 12:
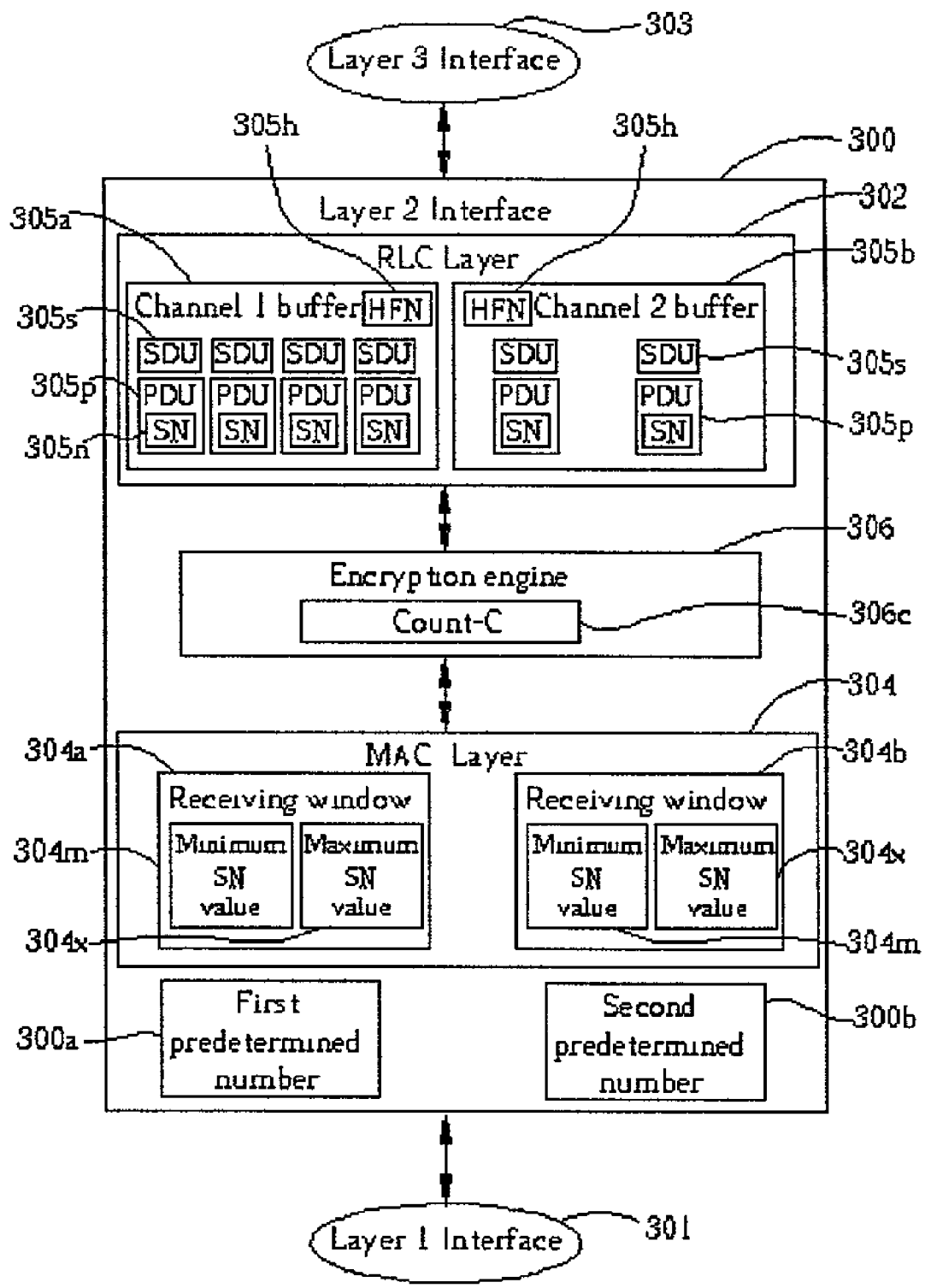
FIG. 12 is a block diagram of a layer 2 interface according to a third embodiment of the present invention.
Figure 13:
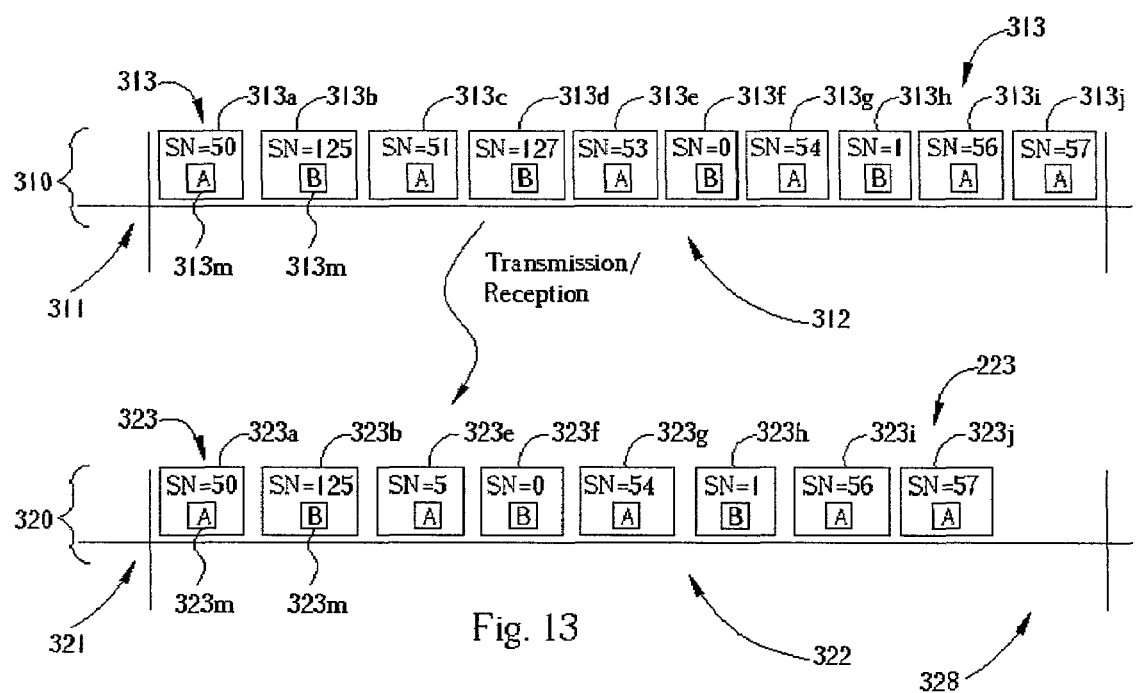
FIG. 13 is a diagram of transmission and reception of PDUs according to the third embodiment of the present invention.

In the above embodiment, it is assumed that the layer 1 interface 201 does not inform the layer 2 interface 200 of PDUs 223 that are lost in the transmission/reception process. The following third embodiment of the present invention, however, considers the situation in which multiple layer 2 logical channels are supported, the PDUs for which are multiplexed onto a single transport channel, and for which the layer 1 interface informs the layer 2 interface of PDUs that were lost in the transmission/reception process, though not necessarily indicating from which logical channel the PDUs were lost. Please refer to FIG. 12 and FIG. 13. FIG. 12 is a block diagram of a layer 2 interface 300 according to the third embodiment of the present invention. FIG. 13 is a diagram of transmission and reception of such layer 2 PDUs according to this third embodiment. In the third embodiment, an RLC layer 302 is capable of supporting a plurality of logical channels, as represented by the logical channel buffers 305a, 305b. For simplicity of discussion, only two logical channels are depicted in FIG. 12, but it should be clear that a greater number of such channels is possible, and that the present invention easily scales up to an arbitrary number of channels. The layer 2 logical channels 305a, 305b are independent of each other, supporting its own range of sequence number values, and each thus having its own hyper-frame number (HFN) 305h. A layer 3 interface 303 sends and receives data to the channels 305a, 305b in the form of layer 2 SDUs 305s. The RLC layer 302 uses the SDUs 305s to build layer 2 PDUs 305p, the sequential ordering of the PDUs 305p conforming to that of the respective SDUs 305s. The RLC layer 302 assigns an SN 305n to each PDU 305p according to the method outlined above in the previous embodiment, with the assignment of the SNs 305n being consistent and independent for each channel 305a, 305b. Hence, for each channel 305a, 305b, if between two immediately adjacent PDUs 305p no SDU data 305s has been discarded, then the SNs 305n of the PDUs 305p differ by a first predetermined value 300a with respect to each other. On the other hand, if SDU data 305s has been discarded between the two adjacent PDUs 305p, then the SN values 305n will differ by a second predetermined number 300b with respect to each other. The term adjacent, as used here, is meant to indicate the intended transmission and reception sequential ordering of the PDUs 305p. Encryption and decryption of the PDUs 305p is performed by an encryption engine 306, which utilizes a count-c value 306c obtained from each PDU 305p. As described previously, the low-order bits of the count-c value 306c are simply the SN 305n of the PDU 305p, with the associated HFN 305h of the SN 305n acting as the high-order bits of the count-c value 306c.

A MAC layer 304 is in communications with each layer 2 logical channel 305a, 305b, informing each channel 305a, 305b of the number of PDUs 305p respectively required for an upcoming TTI 312. The PDUs 305p are multiplexed onto the same transport channel within the TTI 312. A protocol-determined number of MAC PDUs 313 are transmitted by the transmitting-side 310 MAC layer 304 in the TTI 312. To obtain this protocol-determined number of MAC PDUs 313, the MAC layer 304 requests and obtains the requested number of PDUs 305p from the channels 305a and 305b. The MAC layer then adds a MAC header 313m to each PDU 305p to form the MAC PDUs 313. One purpose of the MAC header 313m is to identify the corresponding channel of the MAC PDU 313 so that a receiving-side 320 MAC layer 304 can properly de-multiplex the received MAC PDUs 323 into their proper channel 305a and 305b as received layer 2 logical channel PDUs 305p. The transmitting-side 310 MAC layer 304 sends the MAC PDUs 313 off to a layer 1 interface 301 for transmission. By way of example as shown in FIG. 13, we may assume that the MAC layer 304 requires ten MAC PDUs 313 for transmission in the TTI 312. Taking into account prioritizing and channel scheduling parameters, the MAC layer 304 requests six PDUs 305p from the first logical 305a, and from this generates MAC PDUs 313a, 313c, 313e, 313g, 313i and 313j. Each of these MAC PDUs 313a, 313c, 313e, 313g, 313i and 313j has a MAC header 313m that identifies it as originating from the first logical channel 305a. Similarly, the MAC layer 304 requests four PDUs 305p from the second logical channel 305b, and from these generates four MAC PDUs 313b, 313d, 313f and 313h, each identified as originating from the second logical channel 305b by its respective MAC header 313m. The MAC PDUs 313 are sent off as a block to the layer 1 interface 301 for transmission in the TTI 312.

At this juncture it is worth noting by way of example that MAC PDUs 313a, 313c, 313e, 313g, 313i and 313j have sequence numbers, as provided by the first logical channel 305a, that run respectively as 50, 51, 53, 54, 56 and 57. The transmitting-side 310 first logical channel 305a is thus signaling to the receiving-side 320 first logical channel 305a that SDU data 305s was discarded between PDUs 313c and 313e, and between PDUs 313g and 313i, as the difference between the SN values of these PDU pairs is equal to the second predetermined number 300b, i.e., two. Note that the first logical channel 305a has no way of knowing how its PDUs 305p will be multiplexed by the MAC layer 304 into the TTI 312. Consequently, no meaning is placed upon the difference between sequence number values of immediately adjacent MAC PDUs 313 that are not from the same channel 305a, 305b. The relative difference between sequence number values only carries weight for MAC PDUs 313 from the same logical channel 305a, 305b, as identified by the MAC header 313m. Hence, the fact the SN value of MAC PDU 313a is 50, whereas that for the immediately succeeding MAC PDU 313b is 125 is of no importance as they are from different logical channels. However, the fact that the SN value of the MAC PDU 313c is greater than that for MAC PDU 313a by the first predetermined value 300a (i.e., by one) is of importance, as this signals that no SDU data 305s was discarded by the first logical channel 305a between these two MAC PDUs 313a and 313c. MAC PDUs 313a and 313c are considered immediately adjacent to each other, then, with respect to the first logical channel 305a. The difference between adjacency, as applied to the transport channel of the TTI 312, and as applied to the logical channels 305a, 305b must be duly considered when evaluating sequence numbers.

The MAC PDUs 313 transmitted in the TTI 312 lead to MAC PDUs 323 on the receiving-side 320 in a corresponding TTI 322. Each MAC PDU 323 has a MAC header 323m that helps the MAC layer 304 to de-multiplex the MAC PDUs 323 into their appropriate channels 305a, 305b as RLC channel PDUs 305p. Between MAC PDUs 323b and 323e, the layer 1 interface 301 on the receiving-side 320 informs the MAC layer 304 that two PDUs 323 were lost in the transmission/reception process; specifically, the transmitted PDUs 313c and 313d were lost. The receiving-side 320 MAC layer 304 has no way to know for which channel or channels 305a, 305b the lost PDUs 323 were intended, as the MAC header 323m carries this information and was lost with the PDUs 323. Furthermore, MAC PDU 323e was corrupted in reception, which corruption passed undetected through the CRC checking of the layer 1 interface 301, so that the SN value for MAC PDU 323e is five, instead of 53. MAC PDU 323e is intended for the first logical channel 305a, as indicated by its MAC header 323m. If this corrupted SN value is not detected, the HFN 305h of the first logical channel 305a on the receiving-side 320 will become unsynchronized with the HFN 305h of the first logical channel 305a on the transmitting-side 310. This will lead to encryption/decryption synchronization problems for all subsequent PDUs 305p along the first logical channel 305a, effectively destroying communications along the first logical channel 305a.

To catch such errors, it is the method of the third embodiment to provide a receiving window 304a, 304b for each respective logical channel 305a, 305b. These receiving windows 304a, 304b are maintained and utilized by the MAC layer 304, as it is the MAC layer 304 that learns from the layer 1 interface 301 of PDUs lost in the transmission/reception process. Note that if the RLC layer 302 is capable of obtaining such lost PDU information, then the RLC layer 302 would be equally capable of maintaining and utilizing the receiving windows 304a, 304b. Each receiving window 304a, 304b is defined by a minimum SN value 304m and a maximum SN value 304x. A MAC PDU 323 destined for a particular logical channel 305a, 305b must have an SN that lies within the respective receiving window 304a, 304b of its channel to be considered a valid MAC PDU 323. Such MAC PDUs 323 that do not land within their respective receiving windows 304a, 304b are discarded by the MAC layer 304 as corrupted. To be within a receiving window 304a, 304b, the SN 305n within the MAC PDU 323 must be sequentially on or after the minimum SN value 304m, and must be sequentially on or before the maximum SN value 304x. As before, roll-over of the n-bit SNs 305n must be taken into consideration when determining the sequential ordering of the MAC PDUs 323.

The initial values of the receiving windows 304a, 304b for the TTI 322 are obtained by carrying over the final values of the receiving windows 304a, 304b from a previous TTI 321 into the current TTI 322. The receiving windows 304a, 304b are then updated with each MAC PDU 323 as the MAC PDUs 323 are received in the TTI 322. The method used to update the receiving windows 304a, 304b is outlined briefly in the following, and then shown explicitly by way of example:

1) Obtain the next MAC PDU 323 to be considered, and use the MAC header 323m of the MAC PDU 323 to determine the intended logical channel 305a, 305b of the RLC PDU 305p within the MAC PDU 323, and hence determine the receiving window 304a, 304b associated with the MAC PDU 323.

2) Compare the SN 305n within the MAC PDU 323 against the appropriate receiving window 304d, 304b. If the SN 305n is not within its respective receiving window 304a, 304b, then discard the MAC PDU 323 as corrupted. Otherwise, accept the MAC PDU 323 as valid.

3) If the MAC PDU 323 is valid, for the associated receiving window 304a, 304b, the minimum SN value 304m to be greater than the SN 305n of the MAC PDU 323 by the first predetermined number 300a, and set the maximum SN value 304x to be greater than the SN 305n of the MAC PDU 323 by the second predetermined number 300b. That is, minimum SN value 304m=PDU SN value 305n+first predetermined number 300a; maximum SN value 304x=PDU SN value 305n+second predetermined number 300b.

4) If the MAC PDU 323 is corrupted, for every receiving window 304a, 304b, add the second predetermined number 300b to the maximum SN value 304x. The reason for this is that the corrupted MAC PDU 323 could have potentially been destined for any of the logical channels 305a, 305b. That is, the corruption that escaped the layer 1 interface 301 CRC checking may not only have destroyed the SN 305n within the MAC PDU 323, but could also have scrambled the MAC header 323m. All receiving windows 304a, 304b should thus be updated to err on the side of caution.

5) Before returning back to step (1) to consider a next MAC PDU 323 that follows the MAC PDU 323 currently under consideration, for each MAC PDU 323 indicated as lost in transmission by the layer 1 interface 301 between the current MAC PDU 323 and the next MAC PDU 323, increment the maximum SN value 304x of every receiving window 304a, 304b by the second predetermined number 300b.

By way of example as presented in FIG. 13, assume that, carrying over from a previous TTI 321, the minimum SN value 304m of the receiving window 304a is 50, and the maximum SN value 304x of the receiving window 304a is 51; the minimum value 304m of the receiving window 304b is 125, and the maximum SN value 304x of the receiving window 304b is 126. Receiving window 304a is applied to the first logical channel 305a, and receiving window 304b is applied to the second logical channel 305b. The MAC PDUs 323 are then considered in order within the TTI 322 as presented below:

323a: The first MAC PDU 323a is targeted for the first logical channel 305a, according to the MAC header 323m, and has an SN value 305n of 50, which is within the receiving window 304a of (50 . . . 51). The first MAC PDU 323a is thus accepted, and the receiving window 304a is updated so that the minimum SN value 304m=50+the first predetermined number 300a=50+1=51, and the maximum SN value 304x=50+the second predetermined number 300b=50+2=52, i.e., (51 . . . 52).

323b: Targeted for the second logical channel 305b, and having an SN value 305n of 125 that is within the receiving window 304b of (125 . . . 126), the second MAC PDU 323b is accepted, causing the second receiving window to have a new range of (126 . . . 127).

323e: Two MAC PDUs 323 were lost between the current MAC PDU 323e and the previous MAC PDU 323b. The maximum SN values 304x of all receiving windows 304a, 304b are consequently incremented twice by the second predetermined number 300b. The first receiving window 304a thus goes from (51 . . . 52) to (51 . . . 56), and the second receiving window 304b goes from (126 . . . 127) to (126 . . . 3). The MAC PDU 323e is targeted for the first logical channel 305a, has an SN value 305n of 5 that is not within the receiving window 304a of (51 . . . 56), and so is discarded. All receiving windows 304a, 304b are thus updated again by incrementing their respective maximum SN values 304x by the second predetermined number 300b. The first receiving window 304a thus goes from (51 . . . 56) to (51 . . . 58), and the second receiving window 304b goes from (126 . . . 3) to (126 . . . 5).

323f: Targeted for the second logical channel 305b, and having an SN value 305n of zero that lies within the range of (126 . . . 5) of the second receiving window 304b, MAC PDU 323f is accepted. The second receiving window 304b thus obtains a range of (1 . . . 2).

323g: Targeted for the first logical channel 305a, and having an SN value 305n of 54 that lies within the range of (51 . . . 58) of the first receiving window 304a, MAC PDU 323g is accepted. The first receiving window 304a thus obtains a range of (55 . . . 56).

323h: Targeted for the second logical channel 305b, and having an SN value 305n of one that lies within the range of (1 . . . 2) of the second receiving window 304b, MAC PDU 323h is accepted. The second receiving window 304b obtains a range of (2 . . . 3).

323i: Targeted for the first logical channel 305a, and having an SN value 305n of 56 that lies within the range of (55 . . . 56) of the first receiving window 304a, MAC PDU 323i is accepted. The first receiving window 304a thus obtains a range of (57 . . . 58).

323j: Targeted for the first logical channel 305a, and having an SN value 305n of 57 that lies within the range of (57 . . . 58) of the first receiving window 304a, MAC PDU 323j is accepted. The first receiving window 304a thus obtains a range of (58 . . . 59).

The final values of the receiving windows 304a, 304b are then used as initial values in a subsequent TTI 328. Hence, going into TTI 328, the receiving window 304a for the first logical channel 305a will have a range of (58 . . . 59), whereas that for the second logical channel 305b will have a range of (2 . . . 3).

In contrast to the prior art, the present invention parses the sequence numbers of received PDUs within a TTI to ensure that the sequence numbers are all within an expected range for the TTI. In a first embodiment, the present invention utilizes a special length indicator as a flag to signal that PDUs were discarded by the transmitter prior to transmission so that the receiver may properly reassemble received PDUs into SDUs. Alternatively, as second and third embodiments, the incremental magnitude of the sequence numbers is used to flag for transmitter-discarded PDUs.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A method for transmitting layer 2 protocol data units (PDUs) in a wireless communications protocol, the wireless communications protocol utilizing a transmission time interval (TTI) in which a predetermined number of PDUs are transmitted, the method comprising:
receiving data from a layer 3 interface;
optionally discarding a portion of the data;
building a plurality of PDUs from the remaining data;
providing each PDU with an n-bit sequence number according to an encoding method, the encoding method comprising:
for each PDU, providing the PDU with a sequence number that is greater than the sequence number of an immediately prior PDU by a first predetermined number if no data was discarded between the data held in the PDU and the data held in the immediately prior PDU, and providing the PDU with a sequence number that is greater than the sequence number of the immediately prior PDU by a second predetermined number if data was discarded between the data held in the PDU and the data held in the immediately prior PDU; and
providing the PDUs for transmission in the TTI.

2. The method of claim 1 in which the second predetermined number is greater than the first predetermined number.

3. The method of claim 2 in which the first predetermined number is one and the second predetermined number is two to provide for a minimal reuse of sequence numbers.

4. A transmitter that encodes layer 2 protocol data unit (PDU) sequence numbers according to the method of claim 1.

5. A method for parsing layer 2 protocol data units (PDUs) received in a transmission time interval (TTI), the layer 2 PDUs having sequence numbers encoded by the method of claim 1, the method comprising:
providing a receiving window for the TTI defined by a minimum sequence number value and a maximum sequence number value, wherein a sequence number is within the receiving window if the sequence number is sequentially on or after the minimum sequence number value and is sequentially on or before the maximum sequence number value;
parsing the sequence number in each PDU received in the TTI to determine if the sequence number is within the receiving window; and
discarding any PDU having a sequence number that is not within the receiving window of the TTI.

6. The method of claim 5 wherein the minimum sequence number value is derived from a sequence number in a previous TTI.

7. The method of claim 6 wherein the sequence number in the previous TTI is the sequentially greatest sequence number found to be within the receiving window of the previous TTI.

8. The method of claim 7 wherein determining the minimum sequence number value comprises adding the first predetermined number to the sequence number in the previous TTI.

9. The method of claim 5 wherein determining the maximum sequence number value comprises adding the product of the second predetermined number and the number of PDUs expected in the TTI to the minimum sequence number value.

10. The method of claim 9 wherein determining the maximum sequence number value further comprises adding the product of the second predetermined number and a number of unaccounted lost PDUs in a previous TTI to the minimum sequence number value.

11. The method of claim 5 further comprising:
providing a maximum sequence number jump limit; and
discarding any PDU in the TTI having a sequence number that is sequentially greater than the sequence number of the immediately prior PDU by the maximum sequence number jump limit.

12. The method of claim 11 wherein deriving the maximum sequence number jump limit comprises multiplying the second predetermined number with a number of unaccounted lost PDUs in the TTI.

13. The method of claim 12 further comprising reducing the maximum sequence jump limit when a PDU lost in reception is accounted for in the TTI.

14. The method of claim 5 further comprising advancing the minimum sequence number value according to the sequence number of an accepted PDU in the TTI.

15. A receiver that parses layer 2 protocol data units according to the method of claim 5.

16. A method for parsing medium access control (MAC) protocol data units (PDUs) received in a transmission time interval (TTI), the MAC PDUs carrying logical channel PDUs having sequence numbers encoded by the method of claim 1, the method comprising:
in a current TTI, providing for each logical channel a receiving window according to a receiving window for the channel in a previous TTI, each receiving window defined by a minimum sequence number value and a maximum sequence number value, wherein a sequence number is within the receiving window if the sequence number is sequentially on or after the minimum sequence number value and is sequentially on or before the maximum sequence number value;
for the current TTI, obtaining a plurality of MAC PDUs from a lower level interface, the lower level interface providing information of any MAC PDU lost in reception;
obtaining the sequence number from a first MAC PDU from the plurality of MAC PDUs;
determining the logical channel associated with the first MAC PDU;
determining if the sequence number of the first MAC PDU is within the corresponding receiving window of the logical channel associated with the first MAC PDU;
if the sequence number of the first MAC PDU is within the corresponding receiving window, then advancing the minimum sequence number value of the corresponding receiving window beyond the sequence number of the first MAC PDU by no more than the first predetermined number; and
for each MAC PDU lost in reception between the first MAC PDU and a subsequent MAC PDU to be parsed, advancing the maximum sequence number value of every receiving window by at least the second predetermined number.

17. The method of claim 16 wherein if the sequence number of the first MAC PDU is within the corresponding receiving window, then the minimum sequence number value of the corresponding receiving window is set to be equal to the sum of the sequence number of the first MAC PDU and the first predetermined number.

18. The method of claim 16 wherein if the sequence number of the first MAC PDU is within the corresponding receiving window, then the maximum sequence number value of the corresponding receiving window is set to be equal to the sum of the sequence number of the first MAC PDU and the second predetermined number.

19. The method of claim 16 wherein if the sequence number of the first MAC PDU is not within the corresponding receiving window, then the maximum sequence number value of the corresponding receiving window is advanced by at least the second predetermined number.

20. The method of claim 19 wherein if the sequence number of the first MAC PDU is not within the corresponding receiving window, then the maximum sequence number value of every receiving window is advanced by at least the second predetermined number.

21. A receiver that parses medium access control (MAC) protocol data units (PDUs) according to the method of claim 16.

22. A method for determining acceptable ranges of received sequence numbers in a wireless communications protocol, the wireless communications protocol utilizing:
protocol data units (PDUs) for transmitting service data units (SDUs), each PDU comprising a sequence number of n bits for indicating a relative sequential ordering of the PDU in a transmitted or received stream of PDUs; and a transmission time interval (TTI) in which a predetermined number of PDUs are transmitted or received;
the method comprising:
receiving a stream of PDUs within a TTI;
determining a starting sequence number and an ending sequence number for received PDUs within the TTI; and
discarding any received PDU within the TTI that has a sequence number that is sequentially before the starting sequence number or that is sequentially after the ending sequence number.

23. The method of claim 22 wherein the starting sequence number is obtained from an ending sequence number of a previous TTI.

24. The method of claim 23 wherein the ending sequence number of the previous TTI is incremented by one to obtain the starting sequence number.

25. The method of claim 22 wherein the ending sequence number is obtained by subtracting one from a result of adding the number of PDUs within the TTI to the starting sequence number.

26. The method of claim 22 wherein the wireless communications protocol additionally utilizes a length indicator (LI) to indicate an ending position of an SDU within a PDU, and a special value is used for the LI to indicate that PDUs were discarded prior to transmission of the received PDUs.

27. The method of claim 26 wherein the special value for the LI enables transmission of sequence numbers in a manner that is predictable for a receiver so that the receiver may generate the starting sequence number and the ending sequence number.

28. The method of claim 27 wherein the sequence number of each and every successive PDU in the stream of PDUs is incremented by a fixed value.

29. The method of claim 28 wherein the fixed value is one.

30. A wireless communications system comprising:
a first station capable of transmitting a stream of protocol data units (PDUs) comprising a predetermined number of PDUs in a transmission time interval (TTI), each PDU comprising a sequence number of n bits for indicating a relative sequential ordering of the PDU in the stream of PDUs; and
a second station capable of receiving the stream of PDUs in the TTI, the second station utilizing:
a starting sequence number;
an ending sequence number; and
an interface for generating the starting sequence number and the ending sequence number, and for discarding any received PDU within the TTI that has a sequence number that is sequentially before the starting sequence number or that is sequentially after the ending sequence number.

31. The wireless communications system of claim 30 wherein the interface utilizes an ending sequence number of a previous TTI to obtain the starting sequence number.

32. The wireless communications system of claim 31 wherein the interface increments the ending sequence number of the previous TTI by one to obtain the starting sequence number.

33. The wireless communications system of claim 30 wherein the interface obtains the ending sequence number by subtracting one from a result of adding the number of PDUs within the TTI to the starting sequence number.

34. The wireless communications system of claim 30 wherein the first station utilizes a length indicator (LI) with a special value to indicate that PDUs were discarded by the first station prior to transmission of the stream of PDUs.

35. The wireless communications system of claim 34 wherein the special value for the LI enables the first station to transmit the stream of PDUs with sequence numbers in a manner that is predictable for the second station so that the second station may generate the starting sequence number and the ending sequence number.

36. The wireless communications system of claim 35 wherein the sequence number of each and every successive PDU in the stream of PDUs is incremented by a fixed value.

37. The wireless communications system of claim 36 wherein the fixed value is one.

* * * * *